US012615499B2

(12) United States Patent
Song

(10) Patent No.: US 12,615,499 B2
(45) Date of Patent: Apr. 28, 2026

(54) ELECTRONIC DEVICE FOR PERFORMING EMERGENCY SERVICE, AND OPERATING METHOD THEREFOR

(71) Applicant: SAMSUNG ELECTRONICS CO., LTD., Suwon-si (KR)

(72) Inventor: Wongeun Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 18/307,335

(22) Filed: Apr. 26, 2023

(65) Prior Publication Data

US 2023/0262441 A1 Aug. 17, 2023

Related U.S. Application Data

(63) Continuation of application No. PCT/KR2021/013805, filed on Oct. 7, 2021.

(30) Foreign Application Priority Data

Nov. 12, 2020 (KR) ........................ 10-2020-0151074
Jan. 5, 2021 (KR) ........................ 10-2021-0001003

(51) Int. Cl.
*H04W 4/90* (2018.01)
*H04W 36/14* (2009.01)
(Continued)

(52) U.S. Cl.
CPC ......... *H04W 4/90* (2018.02); *H04W 36/1443* (2023.05); *H04W 60/04* (2013.01); *H04W 84/042* (2013.01)

(58) Field of Classification Search
CPC .... H04W 4/90; H04W 36/1443; H04W 60/04
(Continued)

(56) References Cited

U.S. PATENT DOCUMENTS 10,791,450 B1 * 9/2020 Bakker ............... H04W 60/005
2009/0239533 A1 * 9/2009 Somasundaram .... H04W 48/16
455/434

(Continued)

FOREIGN PATENT DOCUMENTS

CN 102893668 1/2013
CN 109451549 3/2019
(Continued)

OTHER PUBLICATIONS

International Search Report for PCT/KR2021/013805 mailed Dec. 20, 2021, 3 pages.
(Continued)

*Primary Examiner* — Maria El-Zoobi
(74) *Attorney, Agent, or Firm* — Nixon & Vanderhye, P.C.

(57) ABSTRACT

An example electronic device includes at least one processor, wherein the at least one processor can be configured to confirm an event associated with an emergency service while registered to a first communication system, transmit a service request, corresponding to the event, to a network on the basis of the confirmation of the event, start, on the basis of the transmission of the service request, a timer having an end time that is shorter than the end time of a T3517 timer, search for and select, on the basis of failing to receive a response corresponding to the service request until the timer ends, a cell corresponding to a PLMN of a second communication system that excludes the first communication system, perform at least one operation for registration to the second communication system on the basis of the selected cell, and perform the emergency service corresponding to the event in the second communication system on the basis of the registration to the second communication system.

20 Claims, 15 Drawing Sheets

(51) Int. Cl.
*H04W 60/04* (2009.01)
*H04W 84/04* (2009.01)

(58) Field of Classification Search
USPC ....................................................... 455/404.1
See application file for complete search history.

(56) References Cited

U.S. PATENT DOCUMENTS

| | | | |
|---|---|---|---|
| 2010/0120432 A1 | 5/2010 | Watfa et al. | |
| 2012/0002545 A1 | 1/2012 | Watfa et al. | |
| 2013/0301466 A1 | 11/2013 | Nenner | |
| 2015/0230276 A1 | 8/2015 | Jung et al. | |
| 2016/0255544 A1 | 9/2016 | Watfa et al. | |
| 2018/0376375 A1* | 12/2018 | Turtinen | H04W 28/18 |
| 2020/0008269 A1 | 1/2020 | Kuppelur et al. | |
| 2020/0015128 A1 | 1/2020 | Stojanovski et al. | |
| 2020/0120470 A1 | 4/2020 | Arshad et al. | |
| 2020/0280948 A1 | 9/2020 | Youn et al. | |
| 2020/0336885 A1 | 10/2020 | Schliwa-Bertling et al. | |
| 2020/0336979 A1 | 10/2020 | Aoyagi et al. | |
| 2021/0022099 A1 | 1/2021 | Kumar et al. | |
| 2022/0038879 A1* | 2/2022 | Won | H04W 4/90 |

FOREIGN PATENT DOCUMENTS

| | | |
|---|---|---|
| CN | 110692266 | 1/2020 |
| CN | 111314969 | 6/2020 |
| CN | 111567099 | 8/2020 |
| CN | 111885658 A | 11/2020 |
| EP | 2723126 A1 | 4/2014 |
| KR | 20130080836 A | 7/2013 |
| KR | 20140017557 A | 2/2014 |
| KR | 20150052344 A | 5/2015 |
| KR | 20200124685 A | 11/2020 |
| WO | 2011/156264 | 12/2011 |
| WO | 2017098615 A1 | 6/2017 |
| WO | 2019098641 A1 | 5/2019 |
| WO | 2020/033693 | 2/2020 |
| WO | 2020069760 A1 | 4/2020 |
| WO | 2020202078 A1 | 10/2020 |

OTHER PUBLICATIONS

Written Opinion of the ISA for PCT/KR2021/013805 mailed Dec. 20, 2021, 3 pages.

Extended Search Report dated Apr. 16, 2024 in European Patent Application No. 21892148.4.

Qualcomm Incorporated et al: "Set T3517 to smaller value for emergency services fallback", 3GPP Draft; C1-206109 3GPP TSG-CT WG1 Meeting #126-e. Electronic meeting, Oct. 15-23, 2020, 11 pages, XP051951080.

Qualcomm Incorporated et al, "3GPP TSG CT WG1 Meeting#126-e." C1-205803, Oct. 15, 2020, 325 pages.

Office Action dated Sep. 6, 2025 in Chinese Application No. 202180076244.6 and English-language translation.

Examination Report dated Jan. 16, 2026 in Korean Application No. 10-2021-0001003 and English-language translation.

Examination Report issued Feb. 13, 2026 in Chinese Application No. 202180076244.6 and English language translation.

* cited by examiner

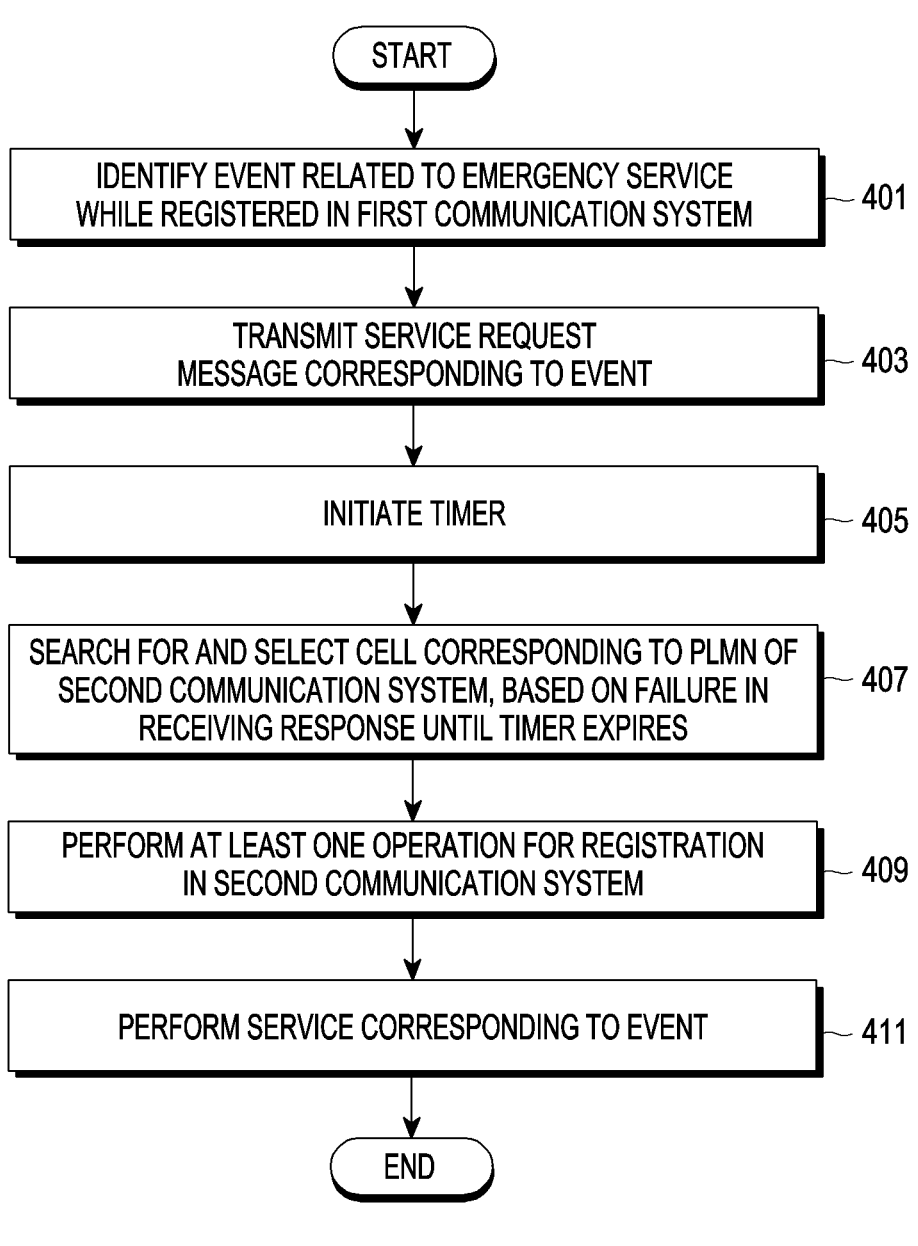

START

IDENTIFY EVENT RELATED TO EMERGENCY SERVICE
WHILE REGISTERED IN FIRST COMMUNICATION SYSTEM — 401

TRANSMIT SERVICE REQUEST
MESSAGE CORRESPONDING TO EVENT — 403

INITIATE TIMER — 405

SEARCH FOR AND SELECT CELL CORRESPONDING TO PLMN OF
SECOND COMMUNICATION SYSTEM, BASED ON FAILURE IN
RECEIVING RESPONSE UNTIL TIMER EXPIRES — 407

PERFORM AT LEAST ONE OPERATION FOR REGISTRATION
IN SECOND COMMUNICATION SYSTEM — 409

PERFORM SERVICE CORRESPONDING TO EVENT — 411

END

FIG. 4

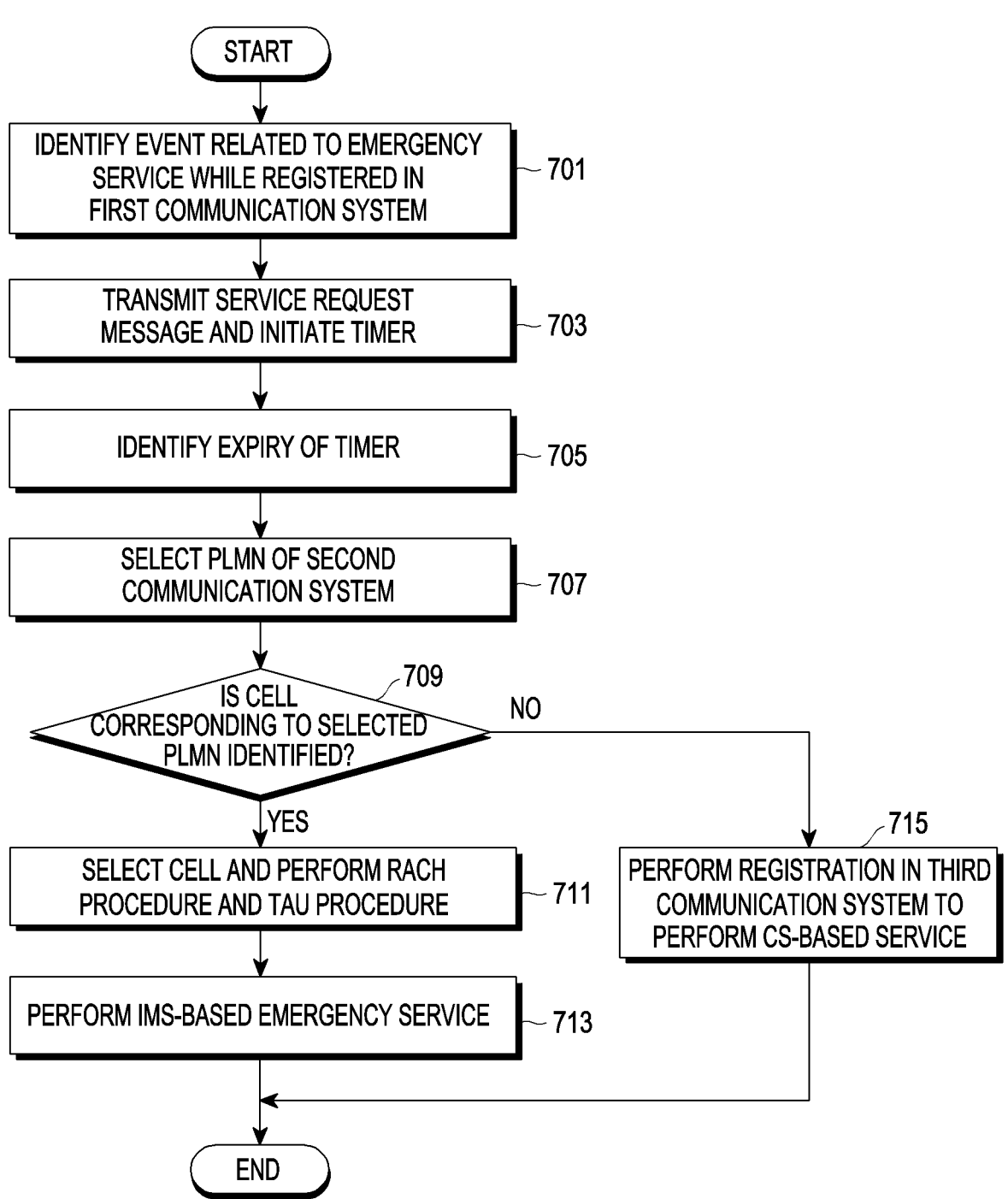

START

IDENTIFY EVENT RELATED TO EMERGENCY
SERVICE WHILE REGISTERED IN
FIRST COMMUNICATION SYSTEM          701

TRANSMIT SERVICE REQUEST
MESSAGE AND INITIATE TIMER          703

IDENTIFY EXPIRY OF TIMER          705

SELECT PLMN OF SECOND
COMMUNICATION SYSTEM          707

709
IS CELL
CORRESPONDING TO SELECTED
PLMN IDENTIFIED?          NO

YES

SELECT CELL AND PERFORM RACH
PROCEDURE AND TAU PROCEDURE          711

715
PERFORM REGISTRATION IN THIRD
COMMUNICATION SYSTEM TO
PERFORM CS-BASED SERVICE

PERFORM IMS-BASED EMERGENCY SERVICE          713

END

FIG. 7

START

PERFORM IMS-BASED EMERGENCY SERVICE BY
USING SECOND COMMUNICATION SYSTEM — 1101

TERMINATE EMERGENCY SERVICE PERFORMANCE — 1103

IDENTIFY LAPSE OF DESIGNATED TIME — 1105

SCAN PRE-STORED FREQUENCY ASSOCIATED
WITH FIRST COMMUNICATION SYSTEM — 1107

IDENTIFY THAT MEASUREMENT RESULT
SATISFIES CELL RESELECTION CONDITION — 1109

PERFORM CELL RESELECTION — 1111

END

ELECTRONIC DEVICE FOR PERFORMING EMERGENCY SERVICE, AND OPERATING METHOD THEREFOR

CROSS-REFERENCE TO RELATED APPLICATIONS

This application is a continuation of International Application No. PCT/KR2021/013805, designating the United States, filed on Oct. 7, 2021, in the Korean Intellectual Property Receiving Office and claiming priority to Korean Patent Application No. 10-2020-0151074, filed Nov. 12, 2020, in the Korean Intellectual Property Office and to Korean Application No. 10-2021-0001003, filed Jan. 5, 2021, in the Korean Intellectual Property Office. The disclosures of each of these applications are incorporated by reference herein in their entireties.

BACKGROUND

Field

The disclosure relates to an electronic device for performing an emergency service and an operation method thereof.

Description of Related Art

In order to support various application scenarios for acquiring an emergency service, a user equipment (UE) and a 5th generation core (5GC) may support a mechanism which hands over the UE to E-UTRA connected to the 5GC using mobilityFromNRCommand or redirects the UE to E-UTRA using RRC release. For example, when new radio (NR) does not support an emergency service, radio access technology (RAT) fallback in which the UE is handed over or redirected to E-UTRA connected to the 5GC may be performed. Alternatively, when the 5GC does not support an emergency service, a system fallback to E-UTRA connected to an evolved pack core (EPC), in which the UE is handed over or redirected to an evolved packet system (EPS), may be performed. When a 5th generation system (5GS) does not indicate support for an emergency service and when the 5GS indicates support for emergency services fallback, the emergency services fallback may be used.

For example, when AMF indicates support to emergency services fallback in a registration accept message, in order to initiate the emergency service, a normally registered UE supporting emergency services fallback may initiate a service request. For example, the UE may transmit a service request to AMF. The UE may receive a response (e.g., an RRC release message or a handover command) that causes system fallback, and thus perform an emergency service in a communication system to which fallback has been performed.

SUMMARY

A UE may perform system fallback (e.g., EPS fallback) based on an RRC release message or a handover command received from a network in response to a service request. However, there is a possibility that the UE cannot receive a response from the network due to deterioration of the electric field situation or temporary problems in the network. Technical specification (TS) 24.501 of the 3rd generation partnership project (3GPP) proposes timer T3517. The UE may wait for a response until the timer T3517 expires after sending the service request. Accordingly, the execution of an emergency service may be delayed due to a response failure until the timer T3517 expires. For example, if the timer T3517 is 15 seconds, an emergency call may be delayed by 15 seconds.

An electronic device and an operation method thereof, according to various embodiments, may perform an emergency service by performing system fallback based on expiration of a timer having an expiration time shorter than the expiration time of the timer T3517.

According to various example embodiments, an electronic device may include at least one processor, wherein the at least one processor is configured to identify an event related to an emergency service while registered in a first communication system, transmit, based on the identification of the event, a service request corresponding to the event to a network, initiate, based on the transmission of the service request, a timer having an expiration time shorter than an expiration time of timer T3517, search for and select a cell corresponding to a PLMN of a second communication system different from the first communication system, based on a failure in receiving a response corresponding to the service request before expiration of the timer, perform, based on the selected cell, at least one operation for registration in the second communication system, and perform, based on the registration in the second communication system, the emergency service corresponding to the event based on the second communication system.

According to various example embodiments, an operation method of an electronic device may include identifying an event related to an emergency service while registered in a first communication system, transmitting, based on the identification of the event, a service request corresponding to the event to a network, initiating, based on the transmission of the service request, a timer having an expiration time shorter than an expiration time of the timer T3517, searching for and selecting a cell corresponding to a PLMN of a second communication system different from the first communication system, based on a failure in receiving a response corresponding to the service request before expiration of the timer, performing, based on the selected cell, at least one operation for registration in the second communication system, and performing the emergency service corresponding to the event based on the second communication system.

According to various example embodiments, an electronic device may include at least one processor, wherein the at least one processor is configured to identify an event related to an emergency service while registered in a first communication system, search for and select a cell corresponding to a PLMN of a second communication system different from the first communication system in response to the identification of the event related to the emergency service, based on identification that an emergency service fallback indicator identified in a registration process of the first communication system is configured as "no support", perform, based on the selected cell, at least one operation for registration in the second communication system, and perform, based on the registration in the second communication system, the emergency service corresponding to the event by using the second communication system.

Various example embodiments may provide an electronic device and an operation method thereof, wherein an emergency service can be performed by performing system fallback based on expiration of a timer having an expiration time shorter than the expiration time of the timer T3517. Accordingly, the emergency service may be prevented from being delayed during the expiration time of the timer T3517, which is a relatively long time according to a standard document.

BRIEF DESCRIPTION OF THE DRAWINGS

The above and/or other aspects of the disclosure will be more apparent by describing certain embodiments of the disclosure with reference to the accompanying drawings, in which:

FIG. 4 is a flowchart illustrating an example operation method of an example electronic device according to various embodiments;

FIG. 7 is a flowchart illustrating an example operation method of an example electronic device according to various embodiments;

DETAILED DESCRIPTION

Figure 1:
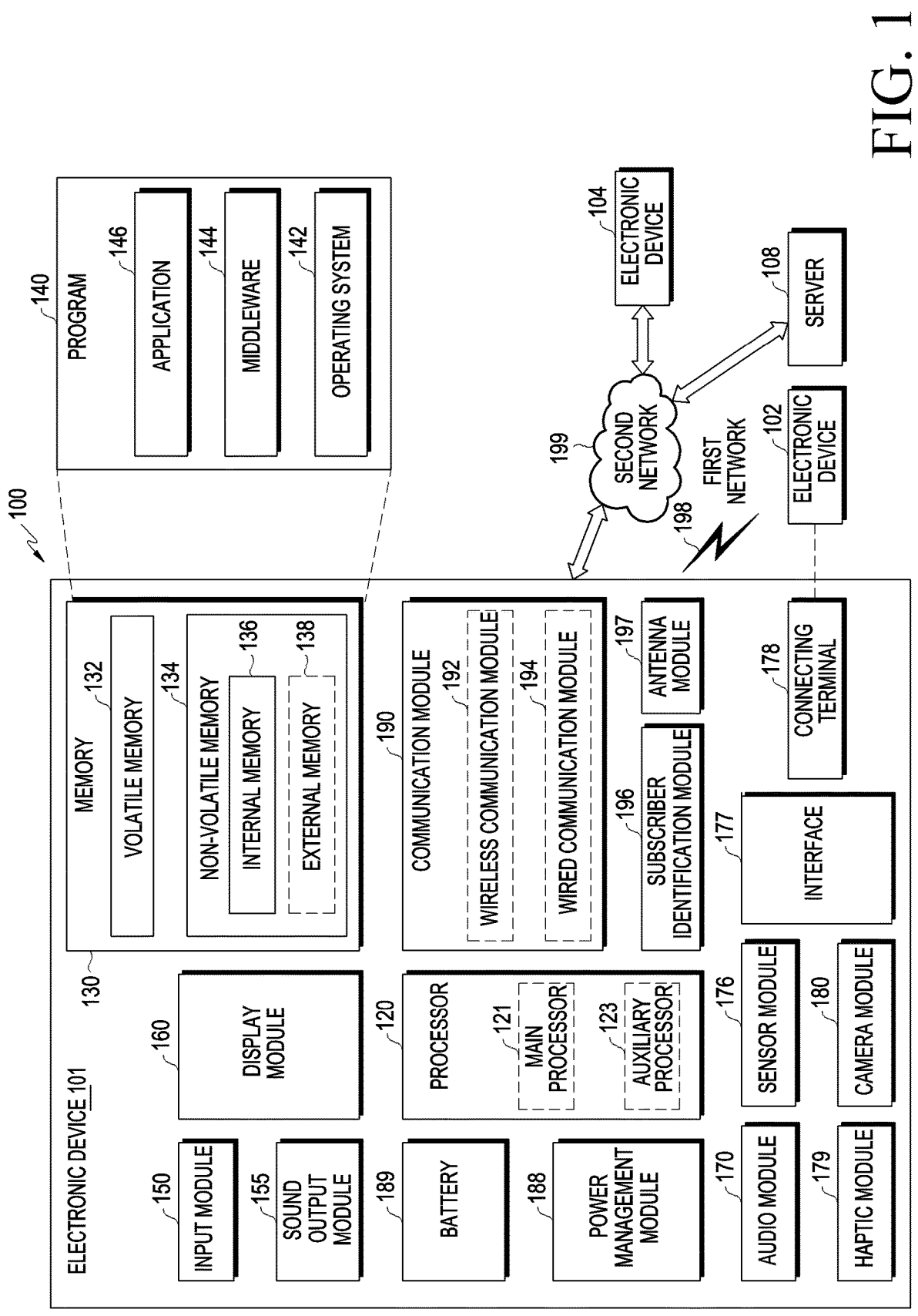
FIG. 1 is a block diagram of an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
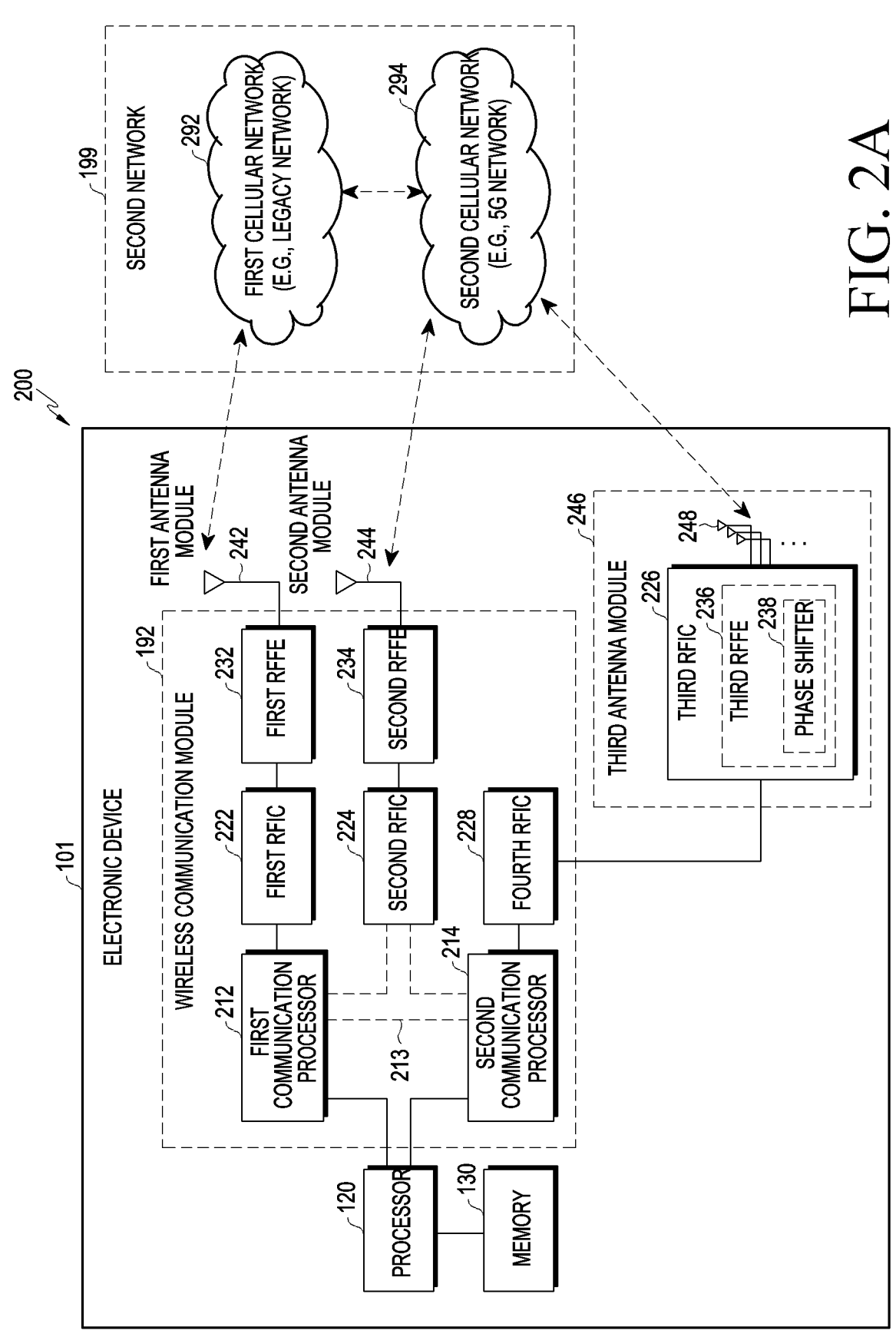
FIGS. 2A and 2B are block diagrams of an example electronic device for supporting legacy network communication and 5G network communication according to various embodiments.

FIG. 2A is a block diagram 200 of an example electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. A second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of a communication module 192. According to an embodiment, the fourth RFIC 228 may be omitted or may be included as a part of the third RFIC 226.

The first communication processor 212 may establish a communication channel for a band to be used for wireless communication with the first cellular network 292, and may support legacy network communication through the established communication channel According to various embodiments, the first cellular network may be a legacy network including a 2G, a 3G, a 4G, or a long-term evolution (LTE) network. The second communication processor 214 may establish a communication channel corresponding to a designated band (e.g., from about 6 GHz to about 60 GHz) among bands to be used for wireless communication with the second cellular network 294, and may support 5G network communication through the established communication channel. According to various embodiments, the second cellular network 294 may be a 5G network defined in the 3GPP. Additionally, according to an embodiment, the first communication processor 212 or the second communication processor 214 may establish a communication channel corresponding to another designated band (e.g., about 6 GHz or less) among bands to be used for wireless communication with the second cellular network 294, and may support 5G network communication through the established communication channel.

The first communication processor 212 may transmit and receive data to and from the second communication processor 214. For example, data classified as being transmitted over the second cellular network 294 may be transmitted over the first cellular network 292 through a change. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented as, for example, a universal asynchronous receiver/transmitter (UART) (e.g., high speed-UART (HS-UART) or a peripheral component interconnect bus express (PCIe) interface), but the type thereof is not limited. Alternatively, the first communication processor 212 and the second communication processor 214 may exchange control information and packet data information using, for example, a shared memory. The first communication processor 212 may transmit and receive various types of information, such as sensing information, information about output strength, and information about resource block (RB) allocation, to and from the second communication processor 214.

Depending on implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may transmit and receive data to and from the processor 120 (e.g., the application processor) through the HS-UART interface or the PCIe interface, but the type of interface is not limited. Alternatively, the first communication processor 212 and the second communication processor 214 may exchange control information and packet data information with the processor 120 (e.g., an application processor) using a shared memory.

Figure 2B:
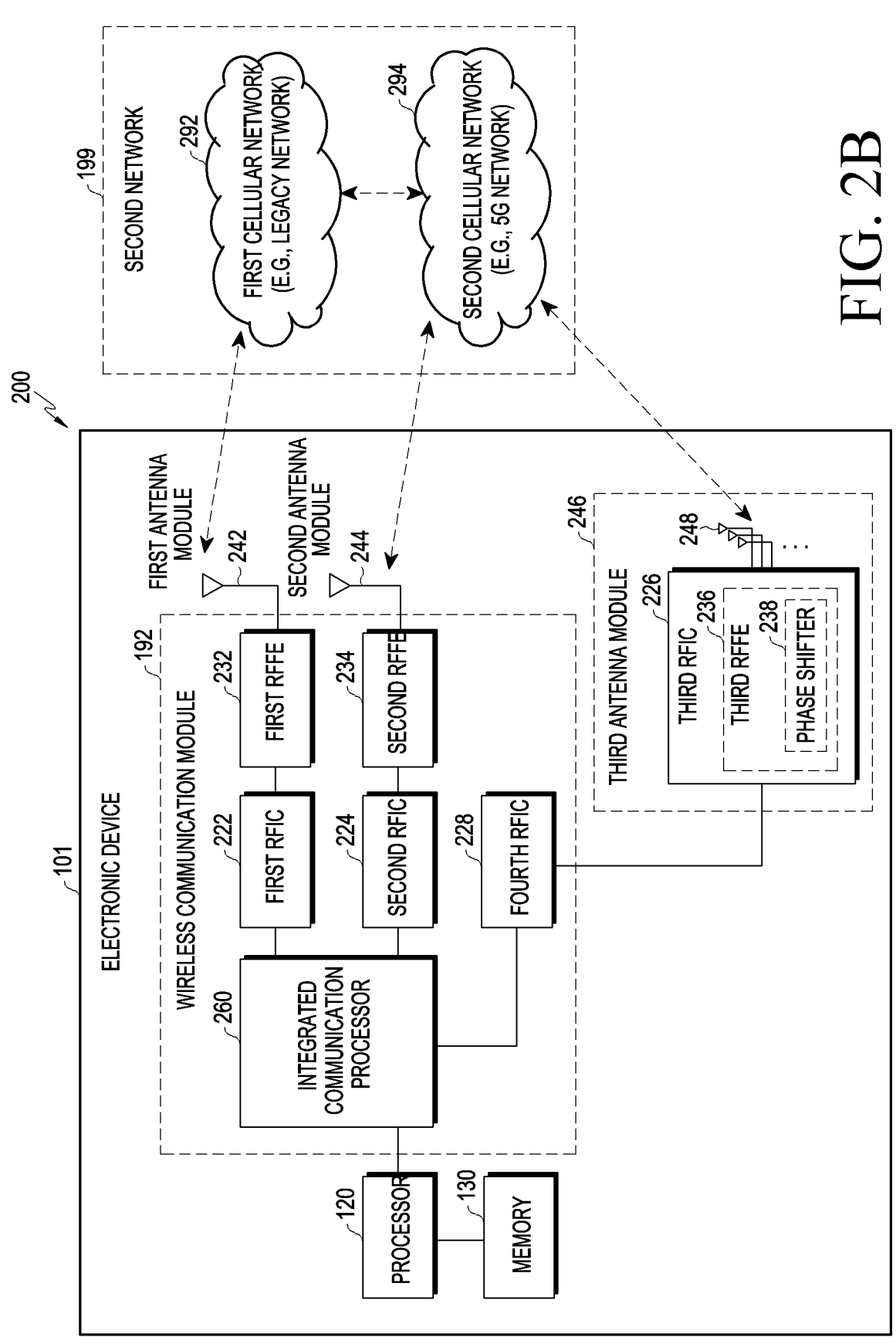

According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. For example, as in FIG. 2B, an integrated communications processor 260 may support all of functions for communication with the first cellular network 292 and the second cellular network 294.

At the time of signal transmission, the first RFIC 222 may convert a baseband signal generated by the first communication processor 212 into a radio-frequency (RF) signal of about 700 MHz to about 3 GHz used for the first cellular network 292 (e.g., the legacy network). At the time of signal reception, an RF signal may be acquired from the first network 292 (e.g., the legacy network) through an antenna (e.g., the first antenna module 242), and may be preprocessed through an RFFE (e.g., the first RFFE 232). The first RFIC 222 may convert the preprocessed RF signal into a baseband signal that can be processed by the first communication processor 212.

At the time of signal transmission, the second RFIC 224 may convert a baseband signal generated by the first communication processor 212 or the second communication processor 214 into an RF signal of a Sub6 band (e.g., about 6 GHz or less) used for the second cellular network 294 (e.g., the 5G network) (hereinafter, referred to as a "5G Sub6 RF signal"). At the time of signal reception, a 5G Sub6 RF signal may be acquired from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal that can be processed by a corresponding communication processor of the first communication processor 212 or the second communication processor 214.

The third RFIC 226 may convert a baseband signal generated by the second communication processor 214 into an RF signal of a 5G Above6 band (e.g., from about 6 GHz to about 60 GHz) to be used in the second cellular network 294 (e.g., a 5G network) (hereinafter, referred to as a "5G Above6 RF signal"). At the time of signal reception, a 5G Above6 RF signal may be acquired from the second cellular network 294 (e.g., the 5G network) through an antenna (e.g., the antennas 248), and may be preprocessed through the third RFFE 236. The third RFIC 226 may convert the preprocessed 5G Above6 RF signal into a baseband signal that can be processed by the second communication processor 214. According to an embodiment, the third RFFE 236 may be formed as a part of the third RFIC 226.

According to an embodiment, the electronic device 101 may include the fourth RFIC 228 separately from the third RFIC 226 or as at least a part of the third RFIC 226. The fourth RFIC 228 may convert a baseband signal generated by the second communication processor 214 into an RF signal of an intermediate frequency band (e.g., from about 9 GHz to about 11 GHz) (hereinafter, referred to as an "IF signal"), and may then transmit the IF signal to the third RFIC 226. The third RFIC 226 may convert the IF signal into a 5G Above6 RF signal. At the time of signal reception, a 5G Above6 RF signal may be received from the second cellular network 294 (e.g., the 5G network) through an antenna (e.g., the antennas 248), and may be converted into an IF signal by the third RFIC 226. The fourth RFIC 228 may convert the IF signal into a baseband signal that can be processed by the second communication processor 214.

According to an embodiment, the first RFIC 222 and the second RFIC 224 may be implemented as at least a part of a single package or a single chip. According to various embodiments, in FIG. 2A or 2B, when the first RFIC 222 and the second RFIC 224 are implemented as a single chip or a single package, the first RFIC 222 and the second RFIC 224 may be implemented as an integrated RFIC. In this case, the integrated RFIC may be connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least a part of a single package or a single chip. According to an embodiment, at least one of the first antenna module 242 or the second antenna module 244 may be omitted, or may be combined with the other antenna module to process RF signals of multiple bands corresponding thereto.

According to an embodiment, the third RFIC 226 and the antennas 248 may be arranged on the same substrate to form the third antenna module 246. For example, the communication module 192 or the processor 120 may be disposed on a first substrate (e.g., a main PCB). In this case, the third antenna module 246 may be formed by disposing the third RFIC 226 in a partial region (e.g., a lower surface) of a second substrate (e.g., a sub-PCB) different from the first substrate and disposing the antennas 248 in another partial region (e.g., an upper surface) of the second substrate. Disposing the third RFIC 226 and the antennas 248 on the same substrate can reduce the length of a transmission line therebetween. This can reduce, for example, a loss (e.g., attenuation) which a signal in a high-frequency band (e.g., from about 6 GH to about 60 GHz) used for 5G network communication suffers through the transmission line. Therefore, the electronic device 101 can enhance the quality or speed of communication with the second network 294 (e.g., the 5G network).

According to an embodiment, the antennas 248 may be formed as an antenna array including multiple antenna elements which can be used for beamforming. In this case, for example, the third RFIC 226 may include, as a part of the third RFFE 236, multiple phase shifters 238 corresponding to the multiple antenna elements. At the time of signal transmission, each of the multiple phase shifters 238 may shift the phase of a 5G Above6 RF signal to be transmitted to the outside (e.g., a base station of a 5G network) of the electronic device 101 through a corresponding antenna element. At the time of signal reception, each of the multiple phase shifters 238 may shift the phase of a 5G Above6 RF signal received from the outside through a corresponding antenna element into an identical or substantially identical phase. This enables transmission or reception through beamforming between the electronic device 101 and the outside.

The second cellular network 294 (e.g., the 5G network) may be operated independently of the first cellular network 292 (e.g., the legacy network) (e.g., standalone (SA)) or may be operated while being connected to the first cellular network 192 (e.g., non-standalone (NSA)). For example, the 5G network may include only an access network (e.g., a 5G radio access network (RAN) or next-generation RAN (NG RAN)), and may not include a core network (e.g., next-generation core (NGC)). In this case, the electronic device 101 may access the access network of the 5G network and may then access an external network (e.g., the Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3A:
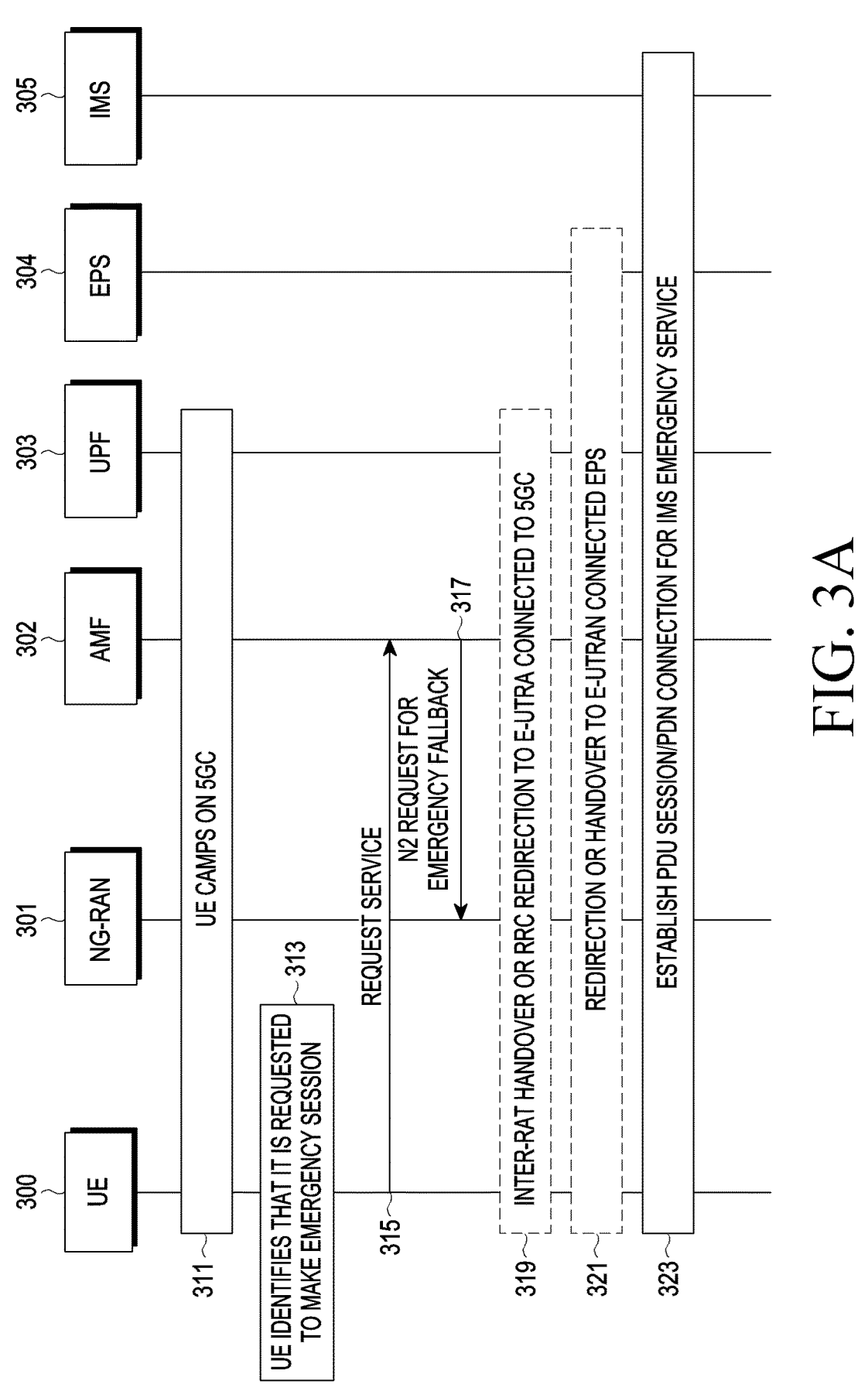
FIG. 3A is a flowchart illustrating an example emergency services fallback process of a user equipment according to various embodiments.

FIG. 3A is a flowchart illustrating an example emergency services fallback process of an example user equipment according to various embodiments.

According to various embodiments, in operation 311, a UE 300 (e.g., the electronic device 101) to camp on a 5th generation system (5GS) using a next generation-radio access network (NG-RAN) 301, an access and mobility management function (AMF) 302, and a user plane function (UPF) 303. For example, the UE 300 may camp on a universal mobile telecommunications system (UMTS) terrestrial radio access (E-UTRA) cell or a new radio (NR) cell in the 5GS. For example, when the 5GS supports an emergency service, the support may be transmitted to the UE 300 through a registration accept message, and may be performed, for example, based on TA and RAT.

According to various embodiments, in operation 313, the UE 300 may identify that it is requested to make an emergency session. For example, pending IMS emergency session requests (e.g., voice) may be received from upper layers. In operation 315, the UE 300 may transmit a service request to the AMF 302. When the AMF 302 indicates, in a registration accept message, that emergency services fallback is supported, the typical UE 300 supporting emergency services fallback may generally transmit a service request, in which a service type is configured as emergency services fallback, in order to initiate emergency service. This may follow, for example, 3rd generation project partnership (3GPP) technical specification (TS) 23.502, but is not limited thereto.

According to various embodiments, in operation 317, the AMF 302 may provide an N2 request for emergency fallback to the NG-RAN 301. After receiving the service request for the emergency service, the AMF 302 may trigger, based on factors such as N26 availability, network configuration, and raid conditions, an N2 procedure that causes either IDLE state mobility (redirection) or CONNECTED state mobility (handover procedure) to either E-UTRA/5GC or E-UTRAN/EPC. The 5GC may request emergency services fallback by executing an NG-AP procedure notifying the NR-RAN 301 that the emergency services fallback is a fallback for emergency service. The AMF 302 may notify a target core network for an RAN node to recognize that inter-RAT fallback or inter-system fallback is executed, based on the support of an emergency service within the evolved packet core (EPC) or the 5GC. When the AMF 302 initiates redirection for the UE 300 for which authentication has been successful, the AMF 302 may include a security context in a trigger fallback request to the NG-RNA 301.

According to various embodiments, in operation 319, inter-RAT handover or RRC redirection to E-UTRA connected to the 5GC may be performed. The AMF 302 may redirect the UE 300 to an appropriate RAT/system using the service type indication in the service request. For example, when the UE 300 is currently camping on an NR cell, one of the following two procedures may be performed.

Handover or redirection to an evolved packet system (EPS) 304

Handover or redirection to universal mobile telecommunications system (UMTS) terrestrial radio access (E-UTRA) connected to 5th generation core (5GC)

In operation 321, the NG-RAN 301 may initiate redirection or handover to the E-UTRAN connected to the EPS 304. The NG-RAN 301 may use the security context provided by the AMF 302. If a redirection procedure is used in either operation 319 or operation 321, the redirection procedure may be provided to the UE 300 so that the target core network can perform an appropriate NAS procedure.

After handover to a target cell, the UE 300 may establish a PDU session/PDN connection for an IMS emergency service in operation 323. The UE 300 may perform an IMS procedure for establishing an IMS emergency session according to, for example, a method based on 3GPP TS 23.617.

Figure 3B:
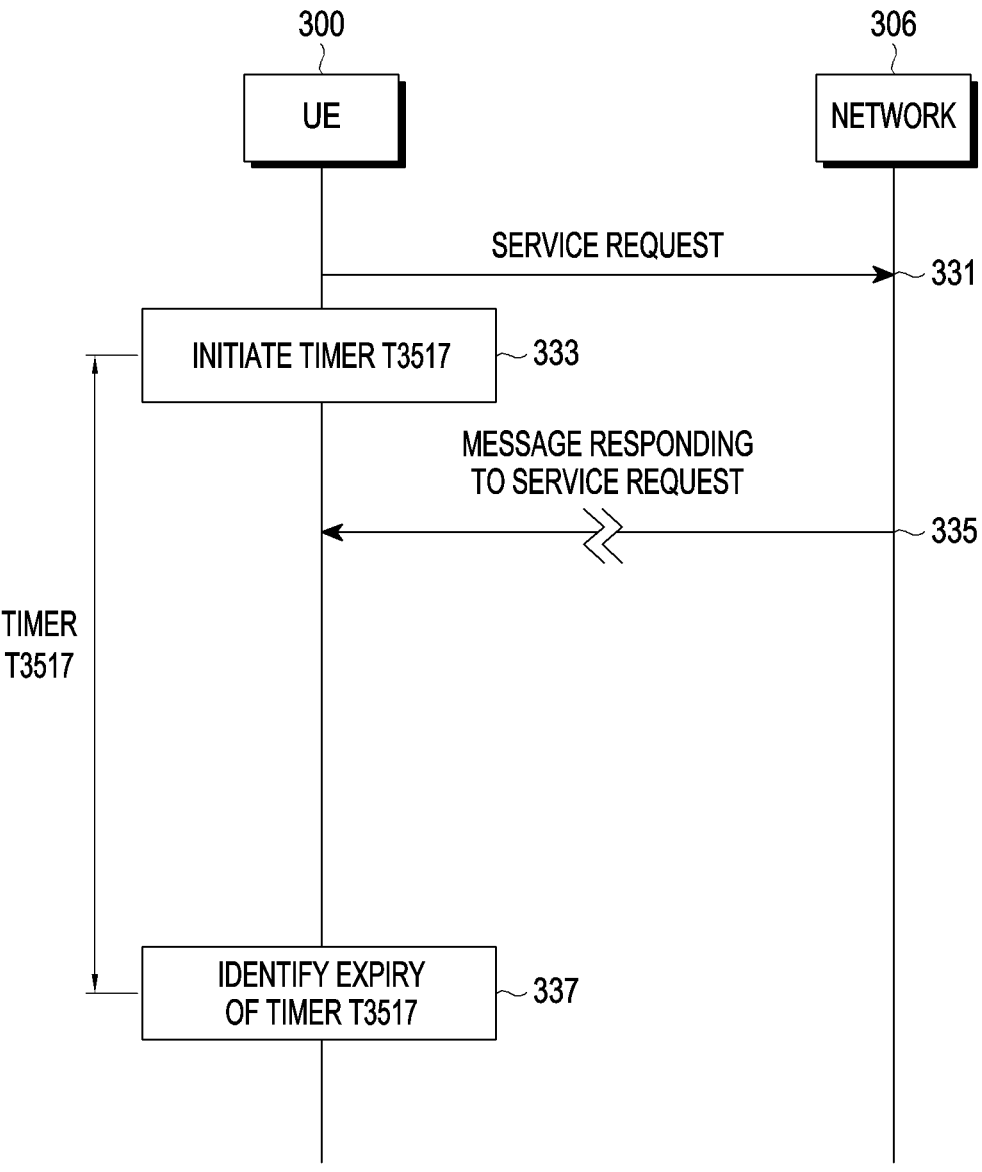
FIG. 3B is a flowchart of a comparative example.

FIG. 3B illustrates a flowchart of a comparative example. At least some of operations of the electronic device 101 according to the comparative example may also be performed by the electronic device 101 according to various embodiments.

In operation 331, a UE 300 (e.g., the electronic device 101) may transmit, to the network 306, a service request in which a service type is configured as emergency services fallback. As described with reference to FIG. 3A, the UE 300 may expect to receive, from the network 306, a handover command (e.g., mobilityFromNRCommand) or an RRC release message causing redirection (e.g., an RRCConnectionrelease message in E-UTRA, or an RRCRelease message in NR). In operation 333, the UE 300 may start timer T3517 based on the transmission of the service request. The timer T3517 may be defined in 3GPP TS 24.501, for example, and may have an expiration time of, for example, 15 seconds, but is not limited thereto. The timer T3517 may be started based on transmission of the service request message. The timer T3517 may be stopped based on reception of a message responding to the service request, for example.

In an example, in operation 335, the network 306 may transmit a message in response to the service request. However, depending on the electric field situation, the UE 300 may fail to receive the message from the network 306. Alternatively, although not illustrated, in another example, the network 306 may fail to receive the service request from the UE 300, and, in this case, the network 306 may not transmit a message responding to the service request. In another example, the network 306 receives a service request from the UE 300, but may not transmit a message responding to the service request due to an internal error of the network 306. According to various examples described above, the UE 300 may fail to receive a message from the network 306 before the expiration time of the timer T3517. In operation 337, the UE 300 may identify expiry of the timer T3517. When the timer T3517 expires, the UE 300 may abort an emergency service procedure. For example, when a service type in the service request message is configured as "emergency services fallback" and when a service request procedure is initiated in a 5GMM-IDLE mode, a 5GMM sublayer may stop the service request procedure, release resources allocated for the service request procedure, and notify upper layers of the failure of the service request procedure. Alternatively, when a service type in the service request message is configured as "emergency services fallback" and when a service request procedure is initiated in a 5GMM-CONNECTED mode, the 5GMM sublayer may stop the service request procedure, stay in the 5GMM-CONNECTED mode, and notify the upper layers of the failure of the service request procedure.

As in 3GPP TS 24.501, when the expiration time of the timer T3517 is 15 seconds, the UE 300 may display a screen showing that an emergency service, for example, an emergency call connection is being attempted for 15 seconds. Accordingly, there is a problem in that the waiting time of the emergency service becomes long even in an emergency situation.

FIG. 4 is a flowchart illustrating an example operation method of an example electronic device according to various embodiments.

According to various embodiments, in operation 401, the electronic device 101 (e.g., at least one of the processor 120, the first communication processor 212, the second communication processor 214, or the integrated communication processor 260) may identify an event related to an emergency service while registered in a first communication system. For example, it is assumed that the electronic device 101 is registered in a 5GS (or 5GC). The electronic device 101 may receive an emergency services fallback request from an upper layer in 5GMM-IDLE mode, 5GMM-CONNECTED mode over 3GPP access, or 5GMM-CONNECTED mode with RRC inactive indication. The electronic device 101 may be registered in 5GS, based on RAT of E-UTRA or NR, for example, and the RAT is not limited. In an embodiment, it is assumed that the electronic device 101 is initially registered in 5GS (or 5GC), but a communication system (or a core network) in which the electronic device 101 is registered is not limited. For example, the electronic device 101 may acquire an emergency call request, and may identify the acquired emergency call request as an event related to an emergency service. The type of emergency service is not limited.

According to various embodiments, in operation 403, the electronic device 101 may transmit a service request message corresponding to the event to a network. For example, the electronic device 101 may configure a service type in the service request message as "emergency services fallback". The purpose of a service type element is to specify the purpose of a service request procedure. The service type is a type 1 information element, and may follow, for example, 3GPP TS 24.501, but is not limited thereto. For example, the electronic device 101 may configure the service type as "emergency services fallback" by configuring a service type value of "0100".

According to various embodiments, in operation 405, the electronic device 101 may start a timer based on the transmission of the service request message. For example, the electronic device 101 may start a timer having an expiration time shorter than the expiration time of timer T3517. For example, the expiration time of the timer may be configured based on the time taken for the electronic device 101 to transmit a service request message to the network and receive a message responding to the service request message from the network. For example, a network operator may configure a maximum period for responding to the service request message, and a time equal to or longer than the maximum period may be configured as the expiration time of the timer, but a configuration method is not limited. For example, the expiration time of the timer may be configured as 1 second, that is shorter than 15 seconds of the timer T3517. Since there may be a difference in time between a transmission time point of the service request message and a reception time point of the response message according to network operators, the expiration time of the timer may be specific to the network operator, and may be changed depending on network conditions according to the implementation.

According to various embodiments, in operation 407, the electronic device 101 may search for and select a cell corresponding to a PLMN of a second communication system, for example, EPS, based on a failure to receive a response until the timer expires. For example, the electronic device 101 may preferentially search for and/or select a registered PLMN (RPLMN) and/or a home PLMN (HPLMN) of the second communication system, but is not limited thereto. The electronic device 101 may search for at least one cell corresponding to the selected PLMN. For example, the electronic device 101 may search for a cell or perform a full scan, based on stored information. The electronic device 101 may select one cell from among at least one cell identified based on the cell search result. For example, the electronic device 101 may select a cell that satisfies a cell selection criterion, but a cell selection method is not limited. As will be described below, the electronic device 101 may identify a cell that is determined to support the second communication system.

According to various embodiments, when a cell is selected, the electronic device 101 may perform, in operation 409, at least one operation for registration in the second communication system. For example, the electronic device 101 may perform an RACH procedure with the selected cell. The electronic device 101 performs a tracking area update (TAU) procedure on the second communication system (EPS) or a core network (e.g., EPC) of the second communication system using an RRC connection established based on the RACH procedure. Alternatively, the electronic device 101 may perform an attach procedure to the core network of the second communication system.

In an example, the electronic device 101 may select a cell supporting the second communication system (or connected to the second communication system) from among cells corresponding to the PLMN of the second communication system. For example, the electronic device 101 may identify, based on system information (e.g., SIB 1) from a cell, the type of communication system (e.g., core network) supported by the cell. Table 1 is an example of SIB 1 (e.g., SystemInformationBlockType1).

TABLE 1

| |
| --- |
| -      TS 36.331: 6.2.2 Message definitions |
| -      SystemInformationBlockType1 |
| PLMN-IdentityInfo ::=      SEQUENCE { |
| plmn-Identity PLMN-Identity, <<<<< |
| cellReservedForOperatorUse      ENUMERATED {reserved, notReserved} |
| } |
| PLMN-IdentityInfo-r15 ::= SEQUENCE { |
| plmn-Identity-5GC-r15      CHOICE{ |
|      plmn-Identity-r15      PLMN-Identity, |
|      plmn-Index-r15      INTEGER (1 . .maxPLMN-r11) |
| }, |

SIB 1 in Table 1 may include "PLMN-IdentityInfo" including "plmn-Identity" and/or "PLMN-IdentityInfo-r15" including "plmn-Identity-5GC-r15". For example, the fact that "PLMN-IdentityInfo" is included in SIB 1 may, for example, imply that a cell corresponding to SIB 1 supports EPC. For example, the fact that "PLMN-IdentityInfo-r15" is included in SIB 1 may, for example, imply that the cell corresponding to SIB 1 supports 5GC. The electronic device 101 may select a cell supporting the second communication system, based on information included in SIB 1 described above. If the electronic device 101 needs to fall back to EPS, the electronic device 101 may select a cell that supports EPS by selecting a cell that has transmitted SIB 1 including "plmn-Identity".

According to various embodiments, in operation 411, the electronic device 101 may perform a service corresponding to an event, based on registration in the second communication system. For example, the electronic device 101 may perform at least one procedure for establishing an IMS emergency session. The at least one procedure for establishing the IMS emergency session may follow, for example, 3GPP TS 23.167, but is not limited thereto.

As described above, the establishment of the IMS emergency session may be started in a network of the second communication system (e.g., EPS), to which the new registration has been made, after the completion of the emergency services fallback operation. Accordingly, even when the electronic device 101 does not receive a response message before the timer T3517 expires and the communication system falls back to the second communication system, the IMS emergency session may be established thereafter, and thus an emergency service is likely to operate normally. Accordingly, the emergency service may be performed after a relatively short expiration time (e.g., 1 second) of a timer without waiting for 15 seconds, which is the standard expiration time of T3517.

Figure 5:
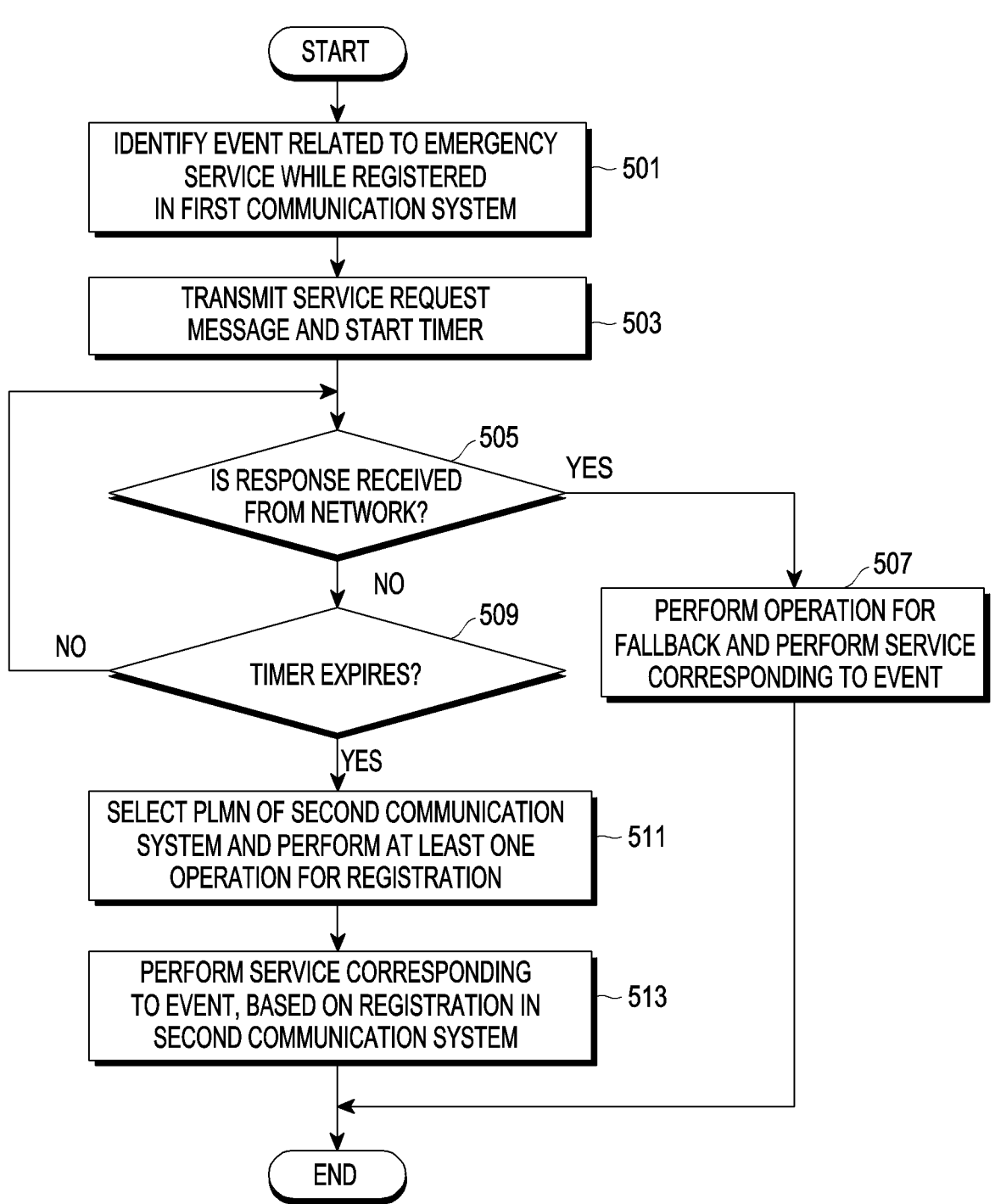
FIG. 5 is a flowchart illustrating an example operation method of an example electronic device according to various embodiments.

FIG. 5 is a flowchart illustrating an example operation method of an example electronic device according to various embodiments.

According to various embodiments, in operation 501, the electronic device 101 (e.g., at least one of the processor 120, the first communication processor 212, the second communication processor 214, or the integrated communication processor 260) may identify an event related to an emergency service while registered in a first communication system. In operation 503, the electronic device 101 may transmit a service request message corresponding to the event to a network, and may start a timer. As described above, the electronic device 101 may transmit a service request message in which a service type is configured as "emergency services fallback". The timer started in operation 503 may have an expiration time shorter than the expiration time of timer T3517.

According to various embodiments, in operation 505, the electronic device 101 may identify whether a response has been received from the network. When the response has been received from the network (505—Yes), in operation 507, the electronic device 101 may perform an operation for fallback to perform system fallback and may perform a service corresponding to the event in a system to which the fallback has been performed. For example, when the electronic device 101 has received an RRC release message causing redirection from the network, the electronic device 101 may perform an operation for the redirection. The electronic device 101 may perform cell search based on the reception of the RRC release message, and may select a cell, based on the search result. The electronic device 101 may perform an RACH procedure with the selected cell. The electronic device 101 may perform registration (e.g., a TAU procedure or an attach procedure) in a second communication system based on an RRC connection established based on the result of performing the RACH procedure. For example, when the electronic device 101 has received a handover command from the network, the electronic device 101 may perform an operation for handover to a target cell designated in the handover command. At least one operation for redirection and/or at least one operation for handover from the first communication system to the second communication system may follow, for example, 3GPP TS 23.502, but is not limited thereto.

According to various embodiments, when a response has not been received from the network (505—No), the electronic device 101 may identify, in operation 509, whether the timer expires. Before the timer expires (509—No), the electronic device 101 may monitor whether a response is received from the network. When the timer has expired (509—Yes), the electronic device 101 may perform, in operation 511, at least one operation for selecting a cell corresponding to a PLMN of the second communication system and registering with the second communication system. When the timer expires, the electronic device 101 may search for and/or select cells corresponding to the PLMN of the second communication system even when no message is received from the network. The electronic device 101 may be registered in the second communication system by performing the RACH procedure with one of the selected cells corresponding to the PLMN and performing the TAU procedure or the Attach procedure to the second communication system, based on the established RRC connection. In operation 513, the electronic device 101 may perform a service corresponding to the event, based on registration in the second communication system. The electronic device 101, for example, may perform an emergency call based on the second communication system.

Figure 6:
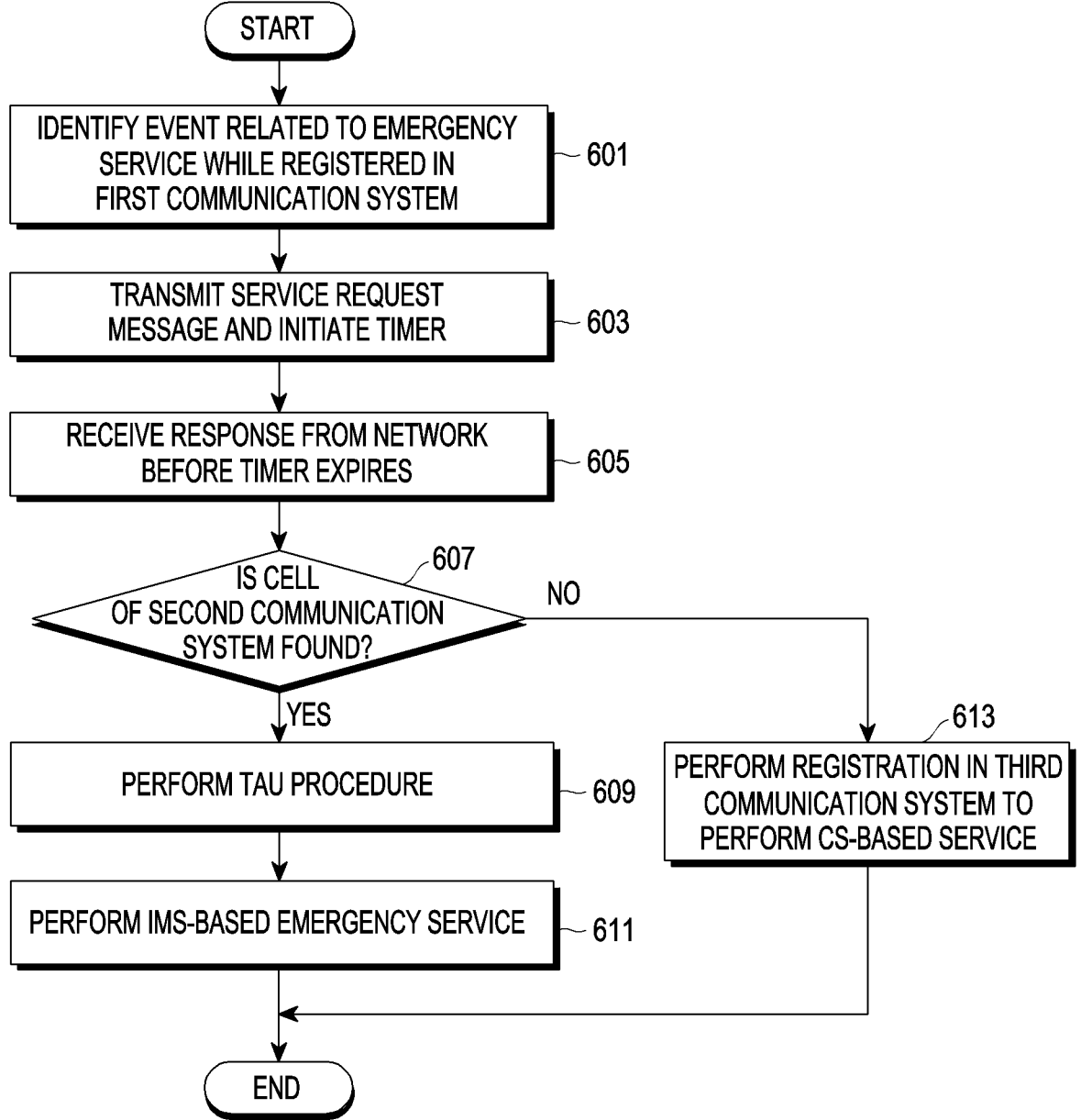
FIG. 6 is a flowchart illustrating an example operation method of an example electronic device according to various embodiments.

FIG. 6 is a flowchart illustrating an example operation method of an example electronic device according to various embodiments.

According to various embodiments, in operation 601, the electronic device 101 (e.g., at least one of the processor 120, the first communication processor 212, the second communication processor 214, or the integrated communication processor 260) may identify an event related to an emergency service while registered in a first communication system. In operation 603, the electronic device 101 may transmit a service request message corresponding to the event to a network, and may start a timer. As described above, the electronic device 101 may transmit a service request message in which a service type is configured as "emergency services fallback". The timer started in operation 603 may have an expiration time shorter than the expiration time of timer T3517, for example. In operation 605, the electronic device 101 may receive a response from the network before the timer expires. For example, the electronic device 101 may receive an RRC release message requesting redirection to a cell of a second communication system or a handover command requesting handover to a cell of the second communication system. The electronic device 101 may stop the timer based on the reception of the message from the network.

According to various embodiments, in operation 607, the electronic device 101 may identify whether a cell of the second communication system is found. If the cell of the second communication system is found (607—Yes), the electronic device 101 may perform a TAU procedure based on one of the found cells in operation 609. For example, when the electronic device 101 is connected to the second communication system (e.g., EPS), the electronic device 101 may perform at least one operation for handover from 5GS to EPS, or at least one operation for inter-system redirection of the N26 interface to EPS. In both cases, the electronic device 101 may perform the TAU procedure, and may perform, for example, a procedure of 3GPP TS 23.502, but is not limited thereto. After performing the TAU procedure, the electronic device 101 may perform an IMS-based emergency service in operation 611. For example, the electronic device 101 may perform at least one procedure for establishing an IMS emergency session, and may perform an emergency service (e.g., an emergency call) based on the IMS emergency session. If the cell of the second communication system is not found (607—No), in operation 613, the electronic device 101 may be registered in a third communication system (e.g., UTMS or GSM) to perform CS-based service.

In various embodiments, the electronic device 101 may identify information about a core network designated in the RRC release message. As described above, for fallback to the second communication system (e.g., a second core network), the network may transmit an RRC release message designating the second core network. For example, Table 2 is an example of an RRCRelease message defined in 3GPP TS 38.331.

TABLE 2

| |
|---|
| -  TS 38.331: RRCRelease (NR/5GC → E-UTRA/EPC or E-UTRA/5GC) |
|     RedirectedCarrierInfo ::= CHOICE { |
|         nr CarrierInfoNR, |

TABLE 2-continued

| |
|---|
|         eutra RedirectedCarrierInfo-EUTRA, |
|         ... |
|     } |
|     RedirectedCarrierInfo-EUTRA ::= SEQUENCE { |
|         eutraFrequency ARFCN-ValueEUTRA, |
|         cnType ENUMERATED {epc, fiveGC} OPTIONAL -- Need N |
|     } |

As in Table 2, the RRCRelease message may include a frequency to be redirected (e.g., eutraFrequency ARFCN-ValueEUTRA) and a core network to be redirected (e.g., cnType ENUMERATED {epc,fiveGC}). If the network transmits an RRCRelease message having a cnType of "epc", the electronic device 101 may perform an emergency service only when camping on a cell supporting EPC. Accordingly, the electronic device 101 may be configured to select a cell supporting a core network designated in the RRC release message.

For example, the electronic device 101 may identify system information corresponding to each of at least one cell identified during searching, for example, system information block (SIB) 1. Based on system information, for example, information included in SIB 1, the electronic device 101 may identify a core network supported by each of the at least one cell. As described above, based on whether "PLMN-IdentityInfo" and/or "PLMN-IdentityInfo-r15" is included in SIB 1, the electronic device 101 may identify whether the corresponding cell supports EPC (or EPS) and/or 5GC (or 5GS). The electronic device 101 may select, message based on SIB 1, a cell corresponding to the core network designated in the RRC release.

According to various embodiments, the electronic device 101 may camp on the cell supporting the core network designated in the RRC release message and perform a subsequent procedure, thereby performing an emergency service.

FIG. 7 is a flowchart illustrating an example operation method of an example electronic device according to various embodiments.

According to various embodiments, in operation 701, the electronic device 101 (e.g., at least one of the processor 120, the first communication processor 212, the second communication processor 214, or the integrated communication processor 260) may identify an event related to an emergency service while registered in a first communication system. In operation 703, the electronic device 101 may transmit a service request message corresponding to the event to a network, and may start a timer. As described above, the electronic device 101 may transmit a service request message in which a service type is configured as "emergency services fallback". The timer started in operation 703 may have an expiration time shorter than the expiration time of timer T3517, for example. The electronic device 101 may fail to identify a response from the network before the expiration time of the timer, and in operation 705, may identify expiry of the timer.

According to various embodiments, in operation 707, the electronic device 101 may select a PLMN corresponding to a second communication system. Based on the identification of the event related to the emergency service and/or on the service type configured as "emergency services fallback", the electronic device 101 may identify that the PLMN to be found corresponds to the second communication system. Accordingly, the electronic device 101 may refrain from selecting a PLMN corresponding only to the first communication system. In operation 709, the electronic device 101 may identify whether a cell corresponding to the selected PLMN is found. In an example, the electronic device 101 may select a cell supporting (or connected to) the second communication system. For example, the electronic device 101 may select and camp on a suitable cell, based on the cell search result, but there is no limitation on the cell to camp on. The electronic device 101 may perform a cell search based on stored information or may perform a full scan. In an example, the electronic device 101 may identify, based on SIB 1 identified as a result of cell search, whether a specific cell supports the second communication system. The electronic device 101 may select and camp on a cell that is determined to support the second communication system. For example, when the strength of reception of a synchronization signal from a first cell is greater than the strength of reception of a synchronization signal from a second cell according to the cell search result, the electronic device 101 may select and camp on the second cell provided that and when it is identified that the first cell does not support the second communication system and the second cell supports the second communication system.

According to various embodiments, in operation 711, the electronic device 101 may select a cell, perform an RACH procedure, and perform a TAU procedure (or an Attach procedure). After being registered in the second communication system, the electronic device 101 may perform an IMS-based emergency service in operation 713. For example, the electronic device 101 may perform at least one procedure for establishing an IMS emergency session, and may perform an emergency service (e.g., an emergency call) based on the IMS emergency session. When the cell of the second communication system is not founded (709—No), in operation 715, the electronic device 101 may be registered in a third communication system (e.g., UTMS or GSM) to perform CS-based service.

Figure 8:
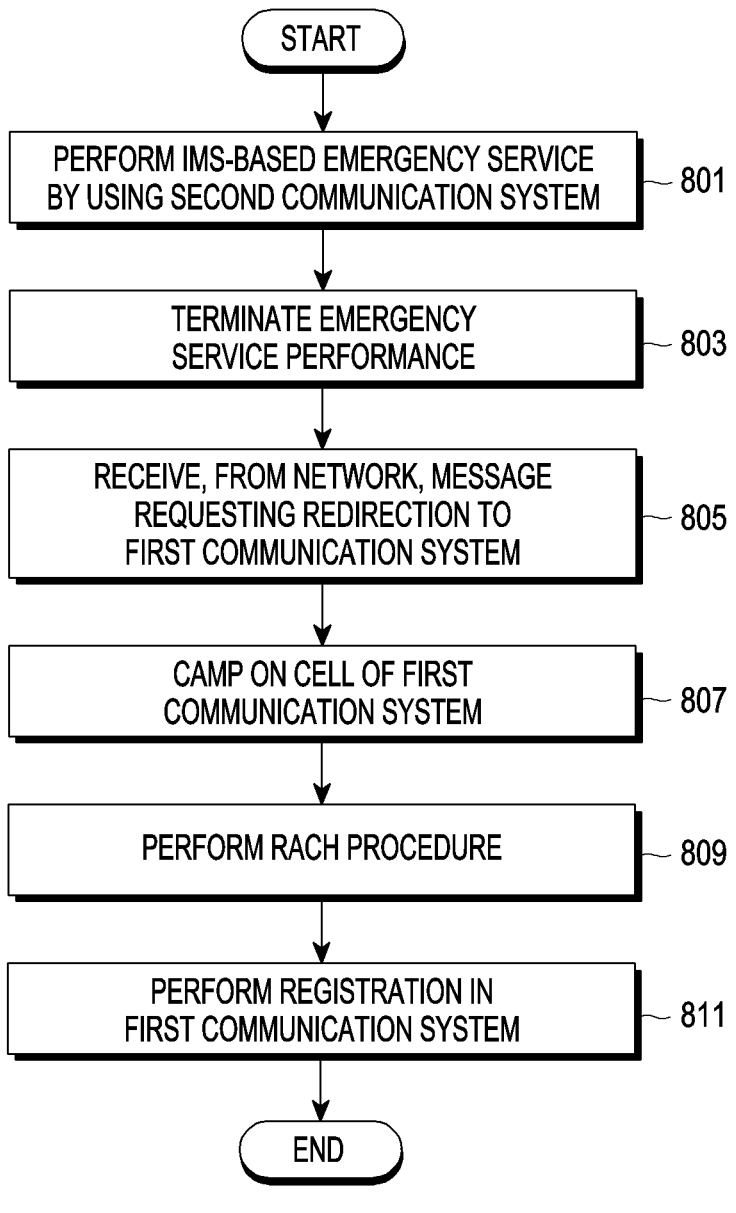
FIG. 8 is a flowchart illustrating an example operation method of an example electronic device according to various embodiments.

FIG. 8 is a flowchart illustrating an example operation method of an example electronic device according to various embodiments.

According to various embodiments, in operation 801, the electronic device 101 (e.g., at least one of the processor 120, the first communication processor 212, the second communication processor 214, or the integrated communication processor 260) may perform an IMS-based emergency service using a second communication system. For example, the electronic device 101 may identify an event related to an emergency service while registered in a first communication system. The electronic device 101 may transmit, to a network, a service request message with a service type configured as "emergency services fallback". In an example, the electronic device 101 may receive a message responding to the service request message from the network, and may perform redirection or handover to the second communication system. In another example, the electronic device 101 may select and register a PLMN of the second communication system, based on expiry of a timer having an expiration time shorter than the expiration time of timer T3517. The electronic device 101 may perform an emergency service, based on registration in the second communication system. In operation 803, the electronic device 101 may terminate the emergency service performance. The electronic device 101 may remain registered in the second communication system even after the emergency service performance is terminated.

While registered in the second communication system in order to perform the emergency service, according to various embodiments, the electronic device 101 may receive a message requesting redirection to the first communication system, for example, an RRC release message, from the network in operation 805 after the emergency service is terminated. For example, the electronic device 101 may perform an emergency service, based on a cell that supports E-UTRA registered in EPC, and then may terminate the performance of the emergency service. The electronic device 101 may receive, from the network, an RRCConnectionRelease message indicating redirection to 5GC. The RRCConnectionRelease message may include a core network to which redirection is to be performed (e.g., cn-Type-r15 ENUMERATED {epc,fivegc}). When cn-Type-r15 ENUMERATED is designated as fivegc, the electronic device 101 may identify that a core network to which redirection is to be performed is 5GC. When it is identified that the electronic device 101 has terminated the emergency service, the network according to various embodiments may induce redirection of the electronic device 101 to a communication system prior to fallback.

According to various embodiments, in operation 807, the electronic device 101 may camp on a cell of the first communication system. For example, the electronic device 101 may camp on a cell supporting the first communication system. When the electronic device 101 receives an RRC release message causing redirection to 5GC, the electronic device 101 may select and camp on one of cells supporting 5GC. For example, the electronic device 101 may identify, based on SIB 1 identified as a result of searching, the type of core network supported by the cell. In operation 809, the electronic device 101 may perform an RACH procedure with respect to the cell. In operation 811, the electronic device 101 may perform registration (e.g., a TAU procedure or an Attach procedure) in the first communication system. As described above, after the emergency service is terminated, the electronic device 101 may return again to the first communication system prior to fallback.

Figure 9:
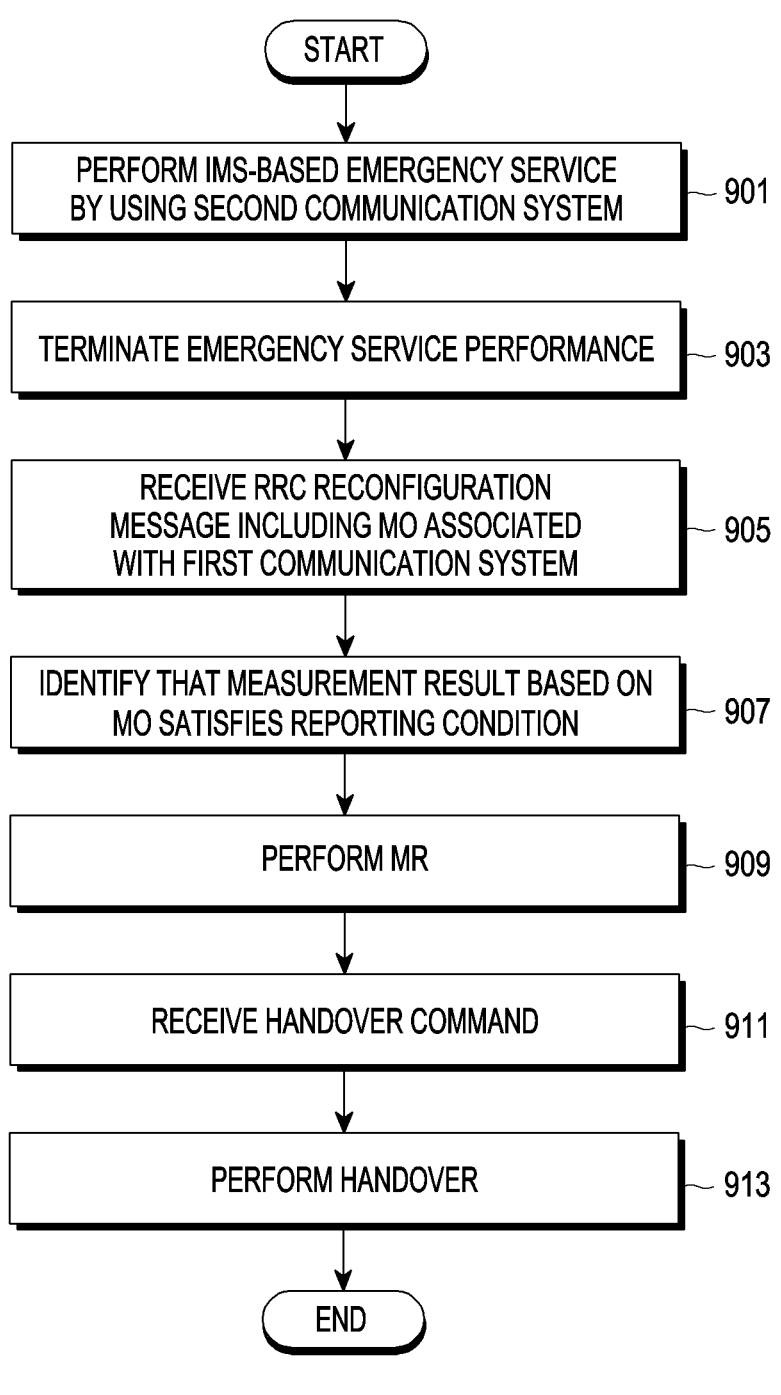
FIG. 9 is a flowchart illustrating an example operation method of an example electronic device according to various embodiments.

FIG. 9 is a flowchart illustrating an example operation method of an example electronic device according to various embodiments.

According to various embodiments, in operation 901, the electronic device 101 (e.g., at least one of the processor 120, the first communication processor 212, the second communication processor 214, or the integrated communication processor 260) may perform an IMS-based emergency service using a second communication system. As described with reference to FIG. 8, the electronic device 101 may transmit a service request message corresponding to an emergency service, and may be registered in the second communication system, based on a response from a network or based on expiry of a timer. The electronic device 101 may perform the emergency service, based on the registration in the second communication system. In operation 903, the electronic device 101 may terminate the emergency service performance. The electronic device 101 may remain registered in the second communication system even after the emergency service is terminated.

According to various embodiments, in operation 905, the electronic device 101 may receive, from the serving cell, an RRC reconfiguration message including an MO associated with a first communication system. The RRC reconfiguration message may be either an RRCConnectionReconfiguration message of 3GPP TS 36.331 or an RRCReconfiguration message of 3GPP TS 38.331. The MO may include information related to a frequency (or a cell) to be measured by a user equipment (UE). The cell-related information may include at least one of a frequency channel number, cell identification information (e.g., a physical cell identifier (PCI), a black list, or an offset value for each cell. The RRC reconfiguration message may include reporting configuration, and may include, for example, a reporting criterion for performing a measurement report (MR). The RRC reconfiguration message may include at least one of a measurement ID for identifying the MO, a quantity configuration indicating a value that is to be measured by the UE, or a measurement gap related to a measurement period. The electronic device 101 may perform measurement based on information in the received RRC Reconfiguration message.

According to various embodiments, in operation 907, the electronic device 101 may identify that the MO-based measurement result (e.g., a layer 3-filtered value) satisfies the reporting criterion. For example, at the measurement timing of a signal (e.g., a synchronization signal and/or a reference signal) from a cell based on the first communication system, it may be identified that reference signal received power (RSRP), reference signal received quality (RSRQ), signal to interference noise ratio (SINR), received signal strength indicator (RSSI), and/or signal-to-noise ratio (SNR) satisfies the reporting criterion (or criteria). In operation 909, the electronic device 101 may perform a measurement report (MR) based on the satisfaction of the reporting criterion. The network may transmit, based on the received MR, a handover command indicating a target cell supporting (or connected to) the first communication system to the electronic device 101. In operation 911, the electronic device 101 may receive the handover command. In operation 913, the electronic device 101 may perform handover based on the received handover command, and may thus be registered in the first communication system, based on the target cell supporting the first communication system.

Figure 10:
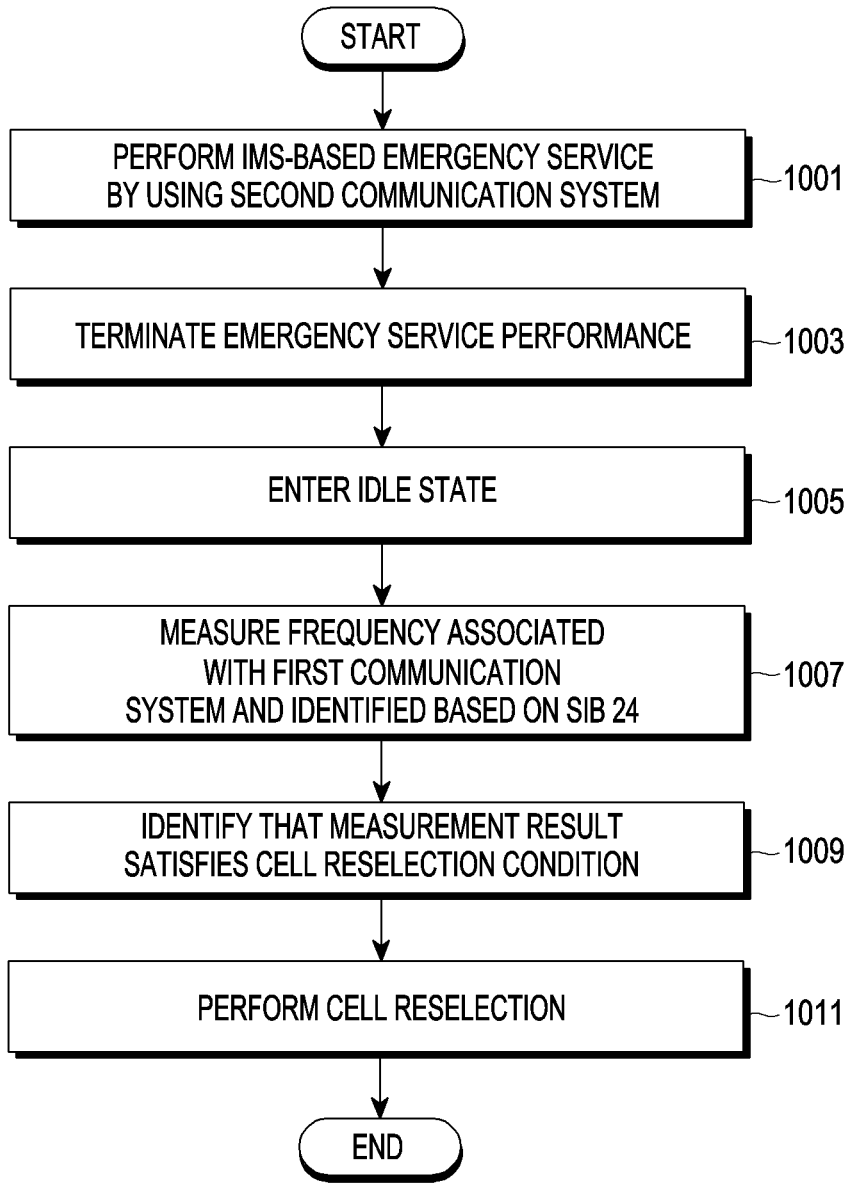
FIG. 10 is a flowchart illustrating an example operation method of an example electronic device according to various embodiments.

FIG. 10 is a flowchart illustrating an example operation method of an example electronic device according to various embodiments.

According to various embodiments, in operation 1001, the electronic device 101 (e.g., at least one of the processor 120, the first communication processor 212, the second communication processor 214, or the integrated communication processor 260) may perform an IMS-based emergency service using a second communication system. As described with reference to FIG. 8, the electronic device 101 may transmit a service request message corresponding to an emergency service, and may be registered in the second communication system, based on a response from a network or based on expiry of a timer. The electronic device 101 may perform the emergency service, based on the registration in the second communication system. In operation 1003, the electronic device 101 may terminate the emergency service performance. The electronic device 101 may remain registered in the second communication system even after the emergency service is terminated. In operation 1005, the electronic device 101 may enter an IDLE state while remaining registered in the second communication system.

According to various embodiments, the electronic device 101 may receive SIB 24 from a serving cell (e.g., eNB). In 3GPP TS 36.331, SIB 24 is described as an information element (IE) of systeminformationblocktype 24. SIB 24 may include information related to only NR neighbor cell and inter-RAT cell reselection for cell reselection, for example, information about NR frequencies supporting the SA mode of 5G. SIB 24 may include cell reselection parameters common to frequencies. SIB 24 may include, for example, frequency information (e.g., ARFCN) of NR supporting the SA mode. The frequency information of NR supporting the SA mode may, for example, imply information supporting 5GC (or 5GS). While camping on a cell associated with the second communication system (e.g., EPC), the electronic device 101 may identify cell information of NR supporting an SA mode of a first communication system (e.g., 5GC) around the cell, for example, information about a cell supporting 5GC. The electronic device 101 according to various embodiments may identify, based on the information included in SIB 24, a frequency supporting the SA mode of the first communication system (e.g., 5GS) in the vicinity.

In operation 1007, the electronic device 101 according to various embodiments may measure the frequency associated with the first communication system and identified based on SIB 24. In operation 1009, the electronic device 101 may identify that the measurement result satisfies a cell reselection criterion (or criteria). In operation 1011, the electronic device 101 may perform cell reselection based on the satisfaction of the cell reselection criterion. The electronic device 101 may camp on a reselected cell, and thus may return to the first communication system (e.g., 5GS).

Figure 11:
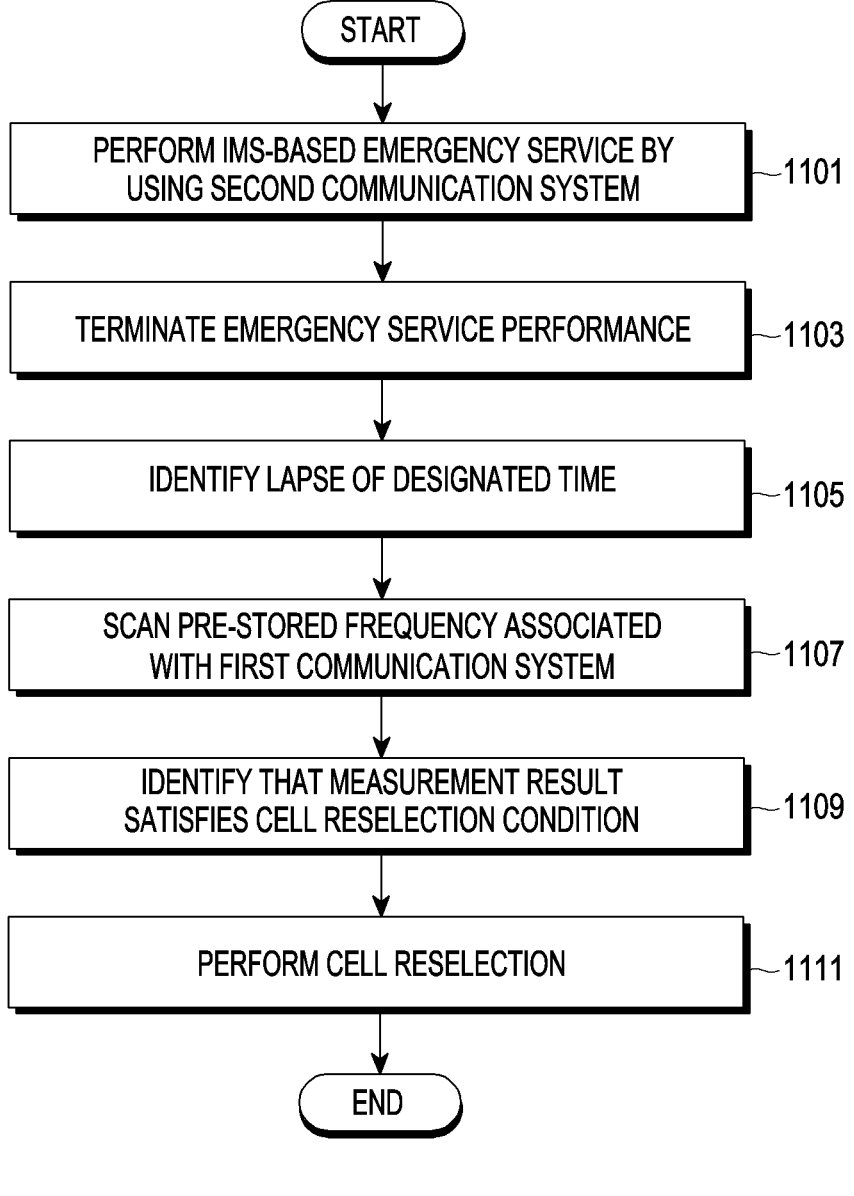
FIG. 11 is a flowchart illustrating an example operation method of an example electronic device according to various embodiments.

FIG. 11 is a flowchart illustrating an example operation method of an example electronic device according to various embodiments.

According to various embodiments, in operation 1101, the electronic device 101 (e.g., at least one of the processor 120, the first communication processor 212, the second communication processor 214, or the integrated communication processor 260) may perform an IMS-based emergency service using a second communication system. As described with reference to FIG. 8, the electronic device 101 may transmit a service request message corresponding to an emergency service, and may be registered in the second communication system, based on a response from a network or based on expiry of a timer. The electronic device 101 may perform the emergency service, based on the registration in the second communication system. In operation 1103, the electronic device 101 may terminate the emergency service performance. The electronic device 101 may remain registered in the second communication system even after the emergency service is terminated. In operation 1105, the electronic device 101 may identify the lapse of a designated time. The electronic device 101 may identify that the registration in the second communication system, to which fallback has been performed, is maintained until, for example, the designated time elapses.

According to various embodiments, in operation 1107, the electronic device 101 may scan a pre-stored frequency associated with the first communication system, based on maintaining the registration in the second communication system, to which fallback has been performed, until the designated time elapses. For example, the electronic device 101 may pre-store and manage information about a frequency supporting an SA mode of the first communication system in advance. For example, the electronic device 101 may store a frequency when registered in (or connected to) the first communication system in an SA mode. In operation 1109, the electronic device 101 may identify that the result of measurement of a specific frequency satisfies a cell reselection criterion. In operation 1111, the electronic device 101 may perform cell reselection based on the satisfaction of the cell reselection criterion.

Figure 12:
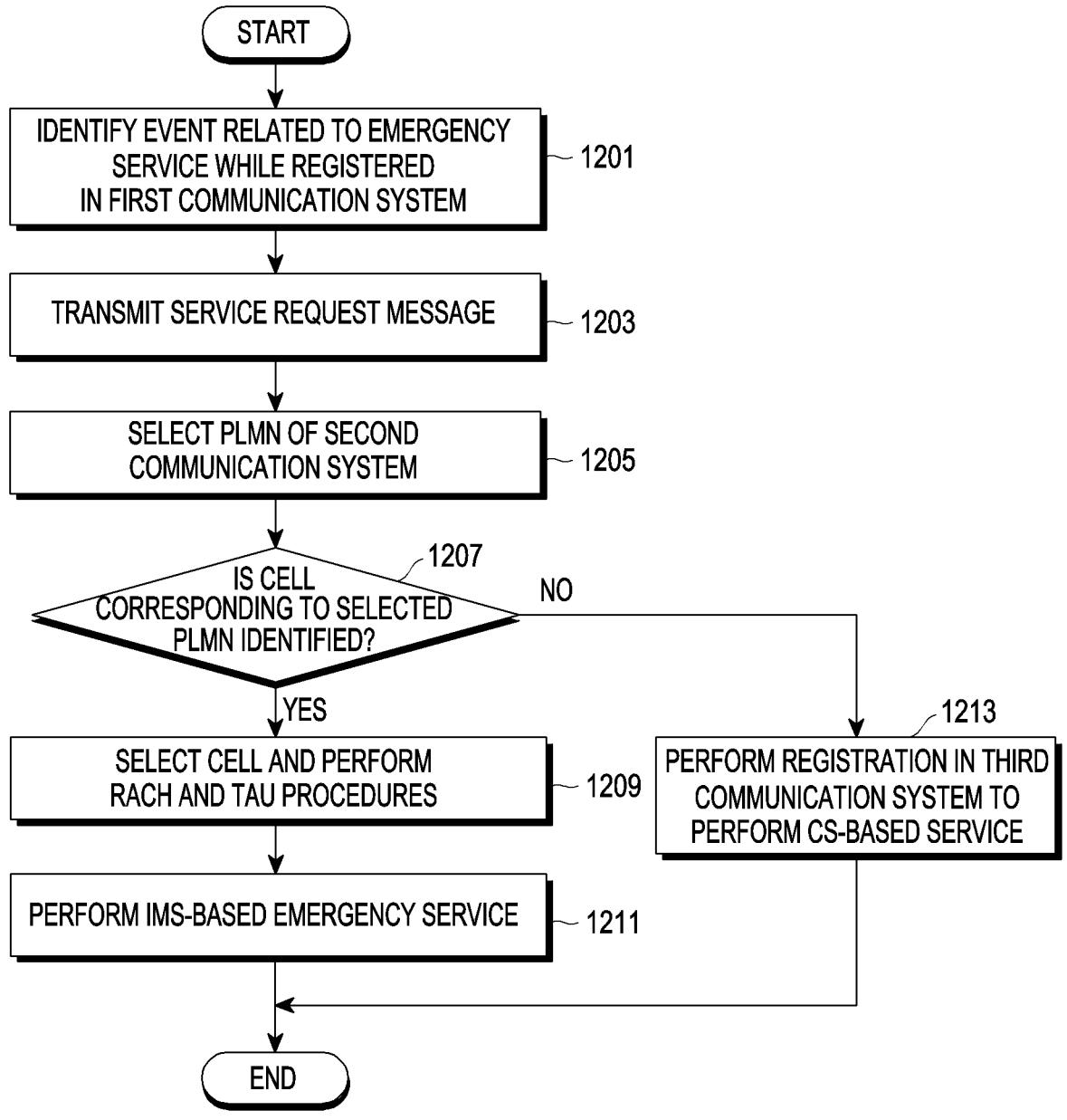
FIG. 12 is a flowchart illustrating an example operation method of an example electronic device according to various embodiments.

FIG. 12 is a flowchart illustrating an example operation method of an example electronic device according to various embodiments.

According to various embodiments, in operation 1201, the electronic device 101 (e.g., at least one of the processor 120, the first communication processor 212, the second communication processor 214, or the integrated communication processor 260) may identify an event related to an emergency service while registered in a first communication system. For example, the electronic device 101 may identify an event related to an emergency service while registered in 5GS (or 5GC). For example, the electronic device 101 may acquire an emergency call request, and may identify the acquired emergency call request as an event related to an emergency service. The type of emergency service is not limited. In operation 1203, the electronic device 101 may transmit a service request message corresponding to the event to a network. For example, the electronic device 101 may configure a service type in the service request message as "emergency services fallback".

According to various embodiments, in operation 1205, the electronic device 101 may select and search for a PLMN of a second communication system, for example, EPS, based on the transmission of the service request message. For example, the electronic device 101 may preferentially select and search for a registered PLMN (RPLMN) and/or a home PLMN (HPLMN) of the second communication system, but is not limited thereto. In operation 1207, the electronic device 101 may identify whether a cell corresponding to the selected PLMN is found. For example, the electronic device 101 may search for a cell associated with the second communication system and corresponding to the selected PLMN, and may perform, for example, a search based on stored information and/or a full scan, but a searching method is not limited. In contrast to the embodiment in FIG. 4, after transmitting the service request message, the electronic device 101 may select the PLMN of the second communication system and search for a cell, without waiting for expiry of a timer.

When a cell corresponding to the selected PLMN is identified (1207—Yes), in operation 1209, the electronic device 101 may select the cell and may perform an RACH procedure and a TAU procedure (or an Attach procedure). Accordingly, the electronic device 101 may be registered in the second communication system. In operation 1211, the electronic device 101 may perform an IMS-based emergency service while registered in the second communication system. After the performance of the emergency service is terminated, the electronic device 101 may return to the first communication system according to the example methods based on FIG. 8, 9, 10, or 11, for example. When a cell corresponding to the selected PLMN is not identified (1305—No), in operation 1213, the electronic device 101 may be registered in a third communication system to perform CS-based service. As described above, a delay in performing the emergency service may be prevented from being caused by an error in an electric field or a network.

Figure 13:
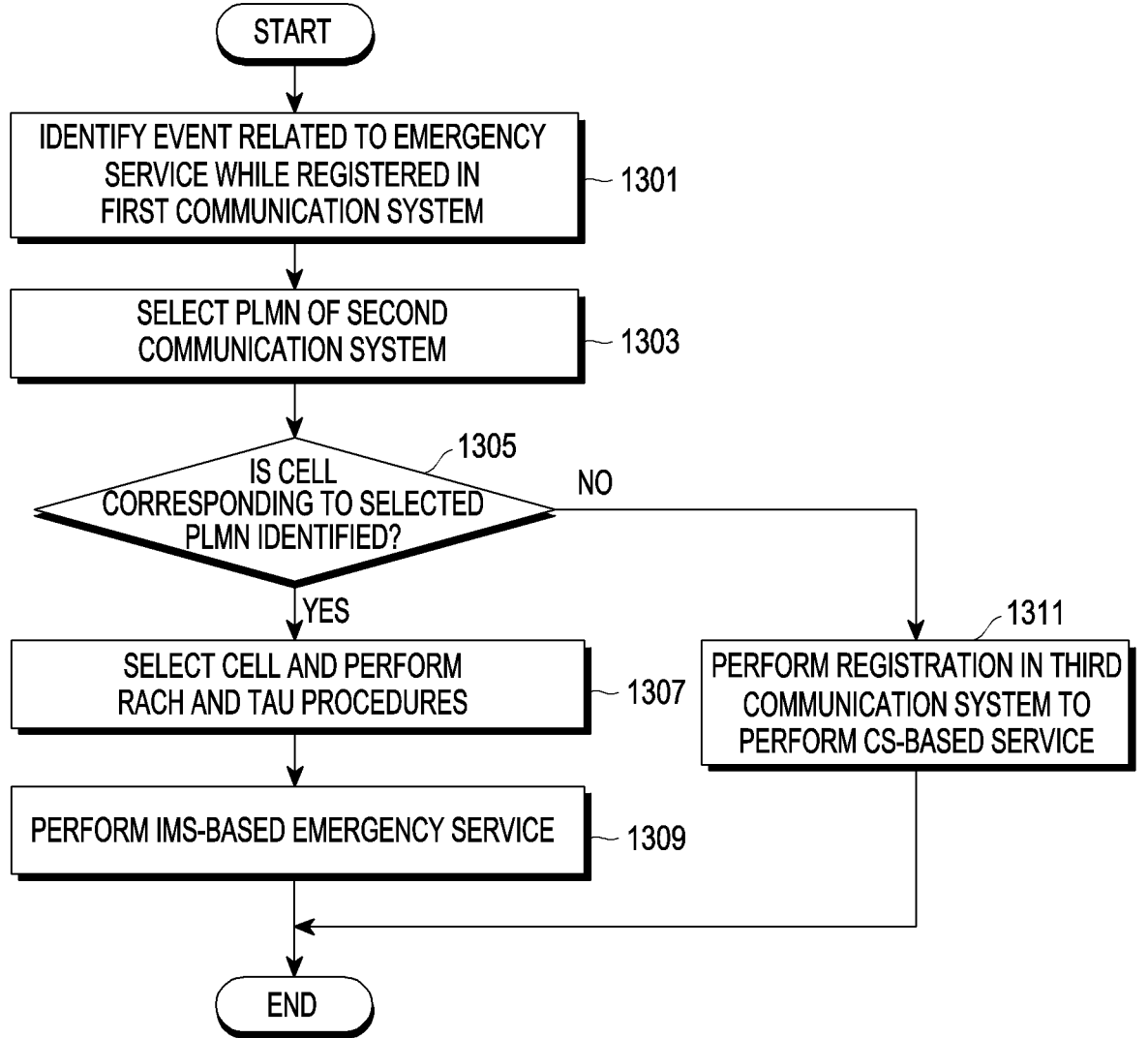
FIG. 13 is a flowchart illustrating an example operation method of an example electronic device according to various embodiments.

FIG. 13 is a flowchart illustrating an example operation method of an example electronic device according to various embodiments.

According to various embodiments, in operation 1301, the electronic device 101 (e.g., at least one of the processor 120, the first communication processor 212, the second communication processor 214, or the integrated communication processor 260) may identify an event related to an emergency service while registered in a first communication system. For example, the electronic device 101 may identify an event related to an emergency service while registered in 5GS (or 5GC). For example, the electronic device 101 may acquire an emergency call request, and may identify the acquired emergency call request as an event related to an emergency service. The type of emergency service is not limited.

According to various embodiments, in operation 1303, the electronic device 101 may select a PLMN of a second communication system, for example, EPS, based on the identification of the event related to the emergency service. For example, the electronic device 101 may preferentially search for and select a registered PLMN (RPLMN) and/or a home PLMN (HPLMN) of the second communication system, but is not limited thereto. In operation 1305, the electronic device 101 may determine whether a cell corresponding to the selected PLMN is identified. For example, the electronic device 101 may search for a cell associated with the second communication system and corresponding to the selected PLMN, and may perform, for example, a search based on stored information and/or a full scan, but a searching method is not limited. In contrast to the embodiment of FIG. 4, without transmitting a service request message, the electronic device 101 may select a PLMN of the second communication system in response to event confirmation related to emergency service, and may search for a cell. For example, when the electronic device 101 has identified that an emergency service fallback indicator indicates "no support" in a registration process of the first communication system, the electronic device 101 may search for a cell corresponding to the second communication system in response to the event identification without transmitting a service request message.

When a cell corresponding to the selected PLMN is identified (1305—Yes), in operation 1307, the electronic device 101 may select the cell and perform an RACH procedure and a TAU procedure (or an Attach procedure). Accordingly, the electronic device 101 may be registered in the second communication system. In operation 1309, the electronic device 101 may perform an IMS-based emergency service in a state registered in the second communication system. After the performance of the emergency service is terminated, the electronic device 101 may return to the first communication system according to the example methods based on FIG. 8, 9, 10, or 11, for example. When a cell corresponding to the selected PLMN is not identified (1305—No), in operation 1311, the electronic device 101 may be registered in a third communication system to perform a CS-based service. As described above, a delay in performing the emergency service may be prevented from being caused by an error in an electric field or a network.

According to various example embodiments, an electronic device may include at least one processor, wherein the at least one processor is configured to identify an event related to an emergency service while registered in a first communication system, transmit, based on the identification of the event, a service request corresponding to the event to a network, initiate, based on the transmission of the service request, a timer having an expiration time shorter than an expiration time of timer T3517, search for and select a cell corresponding to a PLMN of a second communication system different from the first communication system, based on a failure in receiving a response corresponding to the service request before expiration of the timer, perform, based on the selected cell, at least one operation for registration in the second communication system, and perform, based on the registration in the second communication system, the emergency service corresponding to the event based on the second communication system.

According to various example embodiments, the at least one processor may be configured to, as at least a part of the transmitting of the service request corresponding to the event to the network, transmit the service request including a service type of emergency services fallback to the network.

According to various example embodiments, the at least one processor may be configured to perform an RACH procedure with the selected cell as at least a part of the performing of the at least one operation for the registration in the second communication system based on the selected cell, and perform a procedure for the registration in the second communication system, based on an RRC connection established based on the RACH procedure.

According to various example embodiments, the at least one processor may be configured to, as at least a part of the selecting of the cell, select the cell based on information included in SIB 1 from the cell and based on the cell supporting the second communication system.

According to various example embodiments, the at least one processor may be configured to, as at least a part of the performing of the emergency service corresponding to the event, perform at least one procedure for establishing an IMS emergency session.

According to various example embodiments, the at least one processor may be further configured to receive an RRC release message requesting redirection from the network before expiration of the timer, and perform, based on the reception of the RRC release message, a procedure for redirection to the second communication system designated in the RRC release message.

According to various example embodiments, the at least one processor may be further configured to receive a handover command from the network before expiration of the timer, and perform, based on the handover command, a procedure for handover to a target cell supporting the second communication system and designated in the handover command.

According to various example embodiments, the at least one processor may be further configured to identify frequency information supporting a SA mode of the first communication system and identified by SIB 24 received from a serving cell, identify, based on the identified frequency information, another cell supporting the SA mode of the first communication system, after performing the emergency service, and reselect the another cell, based on the another cell satisfying a cell reselection condition.

According to various example embodiments, the at least one processor may be further configured to identify frequency information supporting a SA mode of the first communication system and stored in the electronic device, identify, based on a lapse of a designated time after performing the emergency service, another cell supporting the SA mode of the first communication system, based on the identified frequency information, and reselect the another cell, based on the another cell satisfying a cell reselection condition.

According to various example embodiments, the at least one processor may be further configured to receive an RRC release message requesting redirection to the first communication system after performing the emergency service, and perform a procedure for the redirection to the first communication system designated in the received RRC release message.

According to various example embodiments, the at least one processor may be further configured to receive, after performing the emergency service, an RRC reconfiguration message including a measurement object, perform a measurement report based on a measurement result based on the measurement object satisfying a reporting condition, and perform, based on receiving a handover command in response to the measurement report, a procedure for handover to a target cell designated in the handover command.

According to various example embodiments, an operation method of an electronic device may include identifying an event related to an emergency service while registered in a first communication system, transmitting, based on the identification of the event, a service request corresponding to the event to a network, initiating, based on the transmission of the service request, a timer having an expiration time shorter than an expiration time of timer T3517, searching for and selecting a cell corresponding to a PLMN of a second communication system different from the first communication system, based on a failure in receiving a response corresponding to the service request before expiration of the timer, performing, based on the selected cell, at least one operation for registration in the second communication system, and performing, based on the registration in the second communication system, the emergency service corresponding to the event based on the second communication system.

According to various example embodiments, the transmitting of the service request corresponding to the event to the network comprises, transmitting the service request including a service type of emergency services fallback to the network.

According to various example embodiments, the performing of the at least one operation for the registration in the second communication system, based on the selected cell, may include performing an RACH procedure with the selected cell, and performing a procedure for the registration in the second communication system, based on an RRC connection established based on the RACH procedure.

According to various example embodiments, the selecting of the cell comprises, selecting, based on information included in SIB 1 from the cell, the cell based on the cell supporting the second communication system.

According to various example embodiments, the performing of the emergency service corresponding to the event comprises, performing at least one procedure for establishing an IMS emergency session.

According to various example embodiments, the operation method of the electronic device may further include receiving an RRC release message requesting redirection from the network before expiration of the timer, and performing, based on the reception of the RRC release message, a procedure for redirection to the second communication system designated in the RRC release message.

According to various example embodiments, the operation method of the electronic device may further include receiving a handover command from the network before expiration of the timer, and performing, based on the handover command, a procedure for handover to a target cell supporting the second communication system and designated in the handover command.

According to various example embodiments, the operation method of the electronic device may further include identifying frequency information supporting a SA mode of the first communication system and identified by SIB 24 received from a serving cell, identifying, based on the identified frequency information, another cell supporting the SA mode of the first communication system, after performing the emergency service, and reselecting the another cell, based on the another cell satisfying a cell reselection condition.

According to various example embodiments, an electronic device may include at least one processor, wherein the at least one processor is configured to identify an event related to an emergency service while registered in a first communication system, search for and select a cell corresponding to a PLMN of a second communication system different from the first communication system in response to the identification of the event related to the emergency service, based on identification that an emergency service fallback indicator identified in a registration process of the first communication system is configured as "no support", perform, based on the selected cell, at least one operation for registration in the second communication system, and perform, based on the registration in the second communication system, the emergency service corresponding to the event using the second communication system.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising at least one processor comprising processing circuitry, wherein the at least one processor is configured to:

identify an event related to an emergency service while registered in a 5GS (5$^{th}$ generation system);

transmit, based on the identification of the event, a service request corresponding to the event to a network;

initiate, based on the transmission of the service request, a timer having an expiration time shorter than an expiration time of timer T3517;

search for and select a cell corresponding to a Public Land Mobile Network (PLMN) of a EPS (evolved packet system) different from the 5GS, based on a failure in receiving a response corresponding to the service request before expiration of the timer, wherein the cell is selected based on system information transmitted from the network;

perform, based on the selected cell, at least one operation for registration in the EPS; and perform, based on the registration in the EPS, the emergency service corresponding to the event based on the EPS.

2. The electronic device of claim 1, wherein the at least one processor is configured to, as at least a part of the transmitting of the service request corresponding to the event to the network, transmit the service request comprising a service type of emergency services fallback to the network.

3. The electronic device of claim 1, wherein the at least one processor is configured to, as at least a part of the performing of the at least one operation for the registration in the EPS, based on the selected cell:

perform a Random Access Channel (RACH) procedure with the selected cell; and perform a procedure for the registration in the EPS, based on an Radio Resource Control (RRC) connection established based on the RACH procedure.

4. The electronic device of claim 3, wherein the at least one processor is configured to, as at least a part of the selecting of the cell, select the cell based on information included in System Information Block (SIB) 1 from the cell and based on the cell supporting the EPS.

5. The electronic device of claim 1, wherein the at least one processor is configured to, as at least a part of the performing of the emergency service corresponding to the event, perform at least one procedure for establishing an IP Multimedia Subsystem (IMS) emergency session.

6. The electronic device of claim 1, wherein the at least one processor is further configured to:

receive an RRC release message requesting redirection from the network before expiration of the timer; and perform, based on the reception of the RRC release message, a procedure for redirection to the EPS designated in the RRC release message.

7. The electronic device of claim 1, wherein the at least one processor is further configured to:

receive a handover command from the network before expiration of the timer; and perform, based on the handover command, a procedure for handover to a target cell supporting the EPS and designated in the handover command.

8. The electronic device of claim 1, wherein the at least one processor is further configured to:

identify frequency information supporting a Stand Alone (SA) mode of the 5GS and identified by SIB 24 received from a serving cell;

identify, based on the identified frequency information, another cell supporting the SA mode of the 5GS, after performing the emergency service; and reselect the another cell, based on the another cell satisfying a cell reselection condition.

9. The electronic device of claim 1, wherein the at least one processor is further configured to:

identify frequency information supporting a SA mode of the 5GS and stored in the electronic device;

identify, after performing the emergency service, another cell supporting the SA mode of the 5GS based on the identified frequency information; and request to connect with the another cell supporting the SA mode to the network.

10. The electronic device of claim 1, wherein the at least one processor is further configured to:

receive an RRC release message requesting redirection to the 5GS after performing the emergency service; and perform a procedure for the redirection to the 5GS designated in the received RRC release message.

11. The electronic device of claim 1, wherein the at least one processor is further configured to:

receive, after performing the emergency service, an RRC reconfiguration message comprising a measurement object;

perform a measurement report based on that a measurement result based on the measurement object satisfying a reporting condition; and perform, based on receiving a handover command in response to the measurement report, a procedure for handover to a target cell designated in the handover command.

12. An operation method of an electronic device, the method comprising:

identifying an event related to an emergency service while registered in a 5GS;

transmitting, based on the identification of the event, a service request corresponding to the event to a network;

initiating, based on the transmission of the service request, a timer having an expiration time shorter than an expiration time of timer T3517;

searching for and selecting a cell corresponding to a PLMN of a EPS different from the 5GS, based on a failure in receiving a response corresponding to the service request before expiration of the timer, wherein the cell is selected based on system information transmitted from the network;

performing, based on the selected cell, at least one operation for registration in the EPS; and performing, based on the registration in the EPS, the emergency service corresponding to the event based on the EPS.

13. The operation method of claim 12, wherein the transmitting of the service request corresponding to the event to the network comprises:

transmitting the service request comprising a service type of emergency services fallback to the network.

14. The operation method of claim 12, wherein the performing of the at least one operation for the registration in the EPS, based on the selected cell, comprises:

performing an RACH procedure with the selected cell; and performing a procedure for the registration in the EPS, based on an RRC connection established based on the RACH procedure.

15. The operation method of claim 14, wherein the selecting of the cell comprises:

selecting, based on information included in SIB 1 from the cell, the cell based on the cell supporting the EPS.

16. The method of claim 12, wherein the performing of the emergency service corresponding to the event comprises:

performing at least one procedure for establishing an IP Multimedia Subsystem (IMS) emergency session.

17. The method of claim 12, wherein the method further comprises:

receiving an RRC release message requesting redirection from the network before expiration of the timer; and performing, based on the reception of the RRC release message, a procedure for redirection to the EPS designated in the RRC release message.

18. The method of claim 12, wherein the method further comprises:

receiving a handover command from the network before expiration of the timer; and performing, based on the handover command, a procedure for handover to a target cell supporting the EPS and designated in the handover command.

19. The method of claim 12, wherein the method further comprises:

identifying frequency information supporting a Stand Alone (SA) mode of the 5GS and identified by SIB 24 received from a serving cell;

identifying, based on the identified frequency information, another cell supporting the SA mode of the 5GS, after performing the emergency service; and reselecting the another cell, based on the another cell satisfying a cell reselection condition.

20. The method of claim 12, wherein the method further comprises:

identifying frequency information supporting a SA mode of the 5GS and stored in the electronic device;

identifying, after performing the emergency service, another cell supporting the SA mode of the 5GS based on the identified frequency information; and requesting to connect with the another cell supporting the SA mode to the network.

\* \* \* \* \*